US007735062B2

(12) United States Patent
de Seabra e Melo et al.

(10) Patent No.: US 7,735,062 B2
(45) Date of Patent: Jun. 8, 2010

(54) SOFTWARE DEVELOPMENT SYSTEM AND METHOD

(75) Inventors: Miguel António Cunha de Seabra e Melo, Carnaxide (PT); Lúcio Emanuel Represas Ferrão, Linda-a-Velha (PT); Rodrigo Leal de Faria de Sousa Coutinho, Linda-a-Velha (PT); Carlos Manuel Gregório Alves, Lisboa (PT)

(73) Assignee: OutSystems—Software em Rede, S.A., Linda-a-Velha (PT)

( * ) Notice: Subject to any disclaimer, the term of this patent is extended or adjusted under 35 U.S.C. 154(b) by 1080 days.

(21) Appl. No.: 11/132,041

(22) Filed: May 18, 2005

(65) Prior Publication Data
US 2006/0168558 A1 Jul. 27, 2006

Related U.S. Application Data

(60) Provisional application No. 60/646,112, filed on Jan. 21, 2005.

(51) Int. Cl.
*G06F 9/44* (2006.01)
*G06F 7/00* (2006.01)
*G06F 17/00* (2006.01)

(52) U.S. Cl. .................. 717/120; 717/104; 707/616; 707/638; 707/695; 715/229

(58) Field of Classification Search .............. 717/104, 717/105, 120, 122, 125, 174; 707/203
See application file for complete search history.

(56) References Cited

U.S. PATENT DOCUMENTS

| | | | |
|---|---|---|---|
| 4,315,315 A | 2/1982 | Kossiakoff | |
| 4,558,413 A * | 12/1985 | Schmidt et al. | 707/203 |
| 4,667,290 A | 5/1987 | Goss et al. | |
| 4,794,519 A | 12/1988 | Koizumi et al. | |
| 4,809,170 A | 2/1989 | Leblang et al. | |
| 4,813,013 A | 3/1989 | Dunn | |
| 4,956,773 A | 9/1990 | Saito et al. | |
| 5,041,992 A | 8/1991 | Cunningham et al. | |
| 5,136,705 A | 8/1992 | Stubbs et al. | |
| 5,155,847 A | 10/1992 | Kirouac et al. | |
| 5,758,358 A * | 5/1998 | Ebbo | 707/203 |

(Continued)

FOREIGN PATENT DOCUMENTS

JP    2000235561 A  *  8/2000

(Continued)

OTHER PUBLICATIONS

Aho, et al. "Compilers—Principles, Techniques, and Tools" Addison Wesley, 1986, ISBN 0-201-10194-7, pp. 343-584.

(Continued)

*Primary Examiner*—Michael J Yigdall
(74) *Attorney, Agent, or Firm*—Goodwin Procter LLP

(57) ABSTRACT

A computer design model processing system and methods are described that can create visual models of computer systems, store versions of design models in a centralized repository, automatically generate and deploy computer software systems in response to the stored computer design models, define dependencies between computer design models, and automate and assist the development of multiple, possibly dependent, computer design models by multiple developers.

19 Claims, 17 Drawing Sheets

U.S. PATENT DOCUMENTS

| | | | |
|---|---|---|---|
| 5,850,548 | A | 12/1998 | Williams et al. |
| 6,011,918 | A | 1/2000 | Cohen et al. |
| 6,023,578 | A | 2/2000 | Birsan et al. |
| 6,341,291 | B1* | 1/2002 | Bentley et al. ............... 707/203 |
| 6,460,052 | B1* | 10/2002 | Thomas et al. ............... 707/203 |
| 6,601,023 | B1* | 7/2003 | Deffler et al. ................. 703/13 |
| 6,662,357 | B1* | 12/2003 | Bowman-Amuah ......... 717/120 |
| 6,839,724 | B2* | 1/2005 | Manchanda et al. ......... 707/203 |
| 7,054,885 | B1* | 5/2006 | Hoffman et al. ......... 707/103 Y |
| 7,149,760 | B1* | 12/2006 | Breuer ........................ 707/203 |
| 7,194,489 | B2* | 3/2007 | Bentley et al. ............... 707/203 |
| 7,272,815 | B1* | 9/2007 | Eldridge et al. ............. 717/101 |
| 7,386,529 | B2* | 6/2008 | Kiessig et al. ................. 707/1 |
| 7,464,373 | B1* | 12/2008 | Yunt et al. ................... 717/125 |
| 7,487,080 | B1 | 2/2009 | Tocci et al. |
| 2002/0038230 | A1* | 3/2002 | Chen ............................. 705/7 |
| 2002/0133802 | A1* | 9/2002 | Spradlin et al. ............. 717/104 |
| 2002/0144256 | A1* | 10/2002 | Budhiraja et al. ........... 717/174 |
| 2002/0147763 | A1 | 10/2002 | Lee et al. |
| 2002/0194220 | A1 | 12/2002 | Sluiman |
| 2003/0084424 | A1 | 5/2003 | Reddy et al. |
| 2003/0088857 | A1 | 5/2003 | Balva et al. |
| 2004/0103393 | A1* | 5/2004 | Reddy et al. ................ 717/122 |
| 2004/0107414 | A1* | 6/2004 | Bronicki et al. ............. 717/105 |
| 2004/0243597 | A1* | 12/2004 | Jensen et al. ................ 707/100 |
| 2005/0010894 | A1* | 1/2005 | Potter et al. ................. 717/104 |
| 2005/0060685 | A1 | 3/2005 | Franz et al. |
| 2005/0071804 | A1* | 3/2005 | Miserocchi ................. 717/104 |
| 2006/0064667 | A1* | 3/2006 | Freitas ....................... 717/104 |
| 2006/0101445 | A1* | 5/2006 | Carbajales et al. .......... 717/165 |

FOREIGN PATENT DOCUMENTS

WO     WO-00/23863     4/2000

OTHER PUBLICATIONS

Beguelin, A., et al. "Graphical Development Tools for Network-Based Concurrent Supercomputing" in Proceedings of the 1991 ACM/IEEE conference on Supercomputing. ISBN:0-89791-459-7, pp. 435-444 URL: http://portal.acm.org/citation.cfm?id=126059.

Berczuk, et al. "Software Configuration Management Patterns—Effective Teamwork, Practical Integration" 2002, pp. 54-89.

Cook, et al. "Domain-Specific Modeling and Model Driven Architecture—The Roles of Models in Software Development" Jan. 2004. URL: http://www.bptrends.com/ publicationfiles/01-4%20COL%20Dom%20Spec%20Modeling%20Frankel-Cook.pdf.

Hennicker, et al. "A UML-based Methodology for Hypermedia Design" Oct. 2000, in A. Evans, et al. "UML'2000—The Unified Modeling Language—Advancing the Standard", LNCS 1939, York, England © Springer Verlag, URL: http://www.pst.informatik.uni-muenchen.de/ personen/kochn/Um12000.pdf.

Leblang, et al. "Computer-Aided Software Engineering in a Distributed Workstation Environment" May 1984, in ACM SIGPLAN Notices, vol. 19, Issue 5. pp. 104-112 URL: http:/ / portal.acm.org/ citation.cfm?id=390011.808255.

Luoma, et al. "Defining Domain-Specific Modeling Languages: Collected Experiences" 2004. URL: http://www.dsmforum.org/Events/DSM04/luoma.pdf.

Myers, C. "Software systems as complex networks: Structure, function, and evolvability of software collaboration graphs" The American Physical Society, Oct. 2003.

North, K. "Modeling, Metadata, and XML" Jun. 1999 URL: http://www.dsmforum.org/Events/DSM04/luoma.pdf.

OMG: "Unified Modeling Language Specification" Version 1.3, Jun. 1999. Object Management Group, Inc., Framingham, Mass. URL: http://www.omg.org/cgi-bin/doc?formal/00-03-02.

Ornburn, et al. "Building, Modifying and Using Component Generators" 1993, Proceedings of the 15th international conference on Software Engineering, ISBN: 0-89791-588-7, pp. 391-402 URL: http://portal.acm.org/citation.cfm?id=257662.

Alanen et al. "Change Propagation in a Model-Driven Development Tool" [Online], September 17, 2004, [retrieved on May 17, 2006], Retrieved from the Internet: <http://www.metamodel.com/wisme-2004/present/12.pdf>, pp. 1-8.

Gwizdala et al. "JTracker—A Tool for Change Propagation in Java," Proceedings of the Seventh European Conference of Software Maintenance and Reengineering, March 26, 2003, pp. 223-229.

Melnik, et al. "Rondo: A Programming Platform for Generic Model Management" [Online], Proceedings of the 2003 ACM SIGMOD International Conference of Management of Data, Jun. 9, 2003, [retrieved on May 17, 2006], Retrieved from the Internet: <http://research.microsoft.com/~philbe/RondoSIGMOD03.pdf>, pp. 193-204.

Olsson et al. "Supporting Traceability and Inconsistency Management Between Software Artefacts" [Online], In Proceedings of the 2002 IASTED International Conference on Software Engineering and Applications, Nov. 2, 2002, [retrieved on May 18, 2006], Retrieved from the Internet: <http://www.cs.aukland.ac.nz/~john-g/papers/sea2002.pdf>, pp. 1-6.

Oracle Inc. "Using Oracle9i SCM for Software Configuration Management" [Online], Jul. 2002, [retrieved on December 11, 2006], Retrieved from the Internet: <http://www.oracle.com/technology/products/repository/pdf/appdevscm9i.pdf>, pp. 1-17.

Examination Report for corresponding European Application No. 06398003.1, mailed Jun. 30, 2009, 6 pages.

\* cited by examiner

SOFTWARE DEVELOPMENT SYSTEM AND METHOD

PRIORITY

This application claims the benefit of U.S. Provisional Patent Application Ser. No. 60/646,112, filed Jan. 21, 2005, entitled "Web Services Implementation System."

FIELD

The present invention relates to the development of computer software systems, specifically to those developed using computer design models. More particularly, the invention relates to facilitating the modification of multiple interrelated computer software design models.

BACKGROUND

Development of web-based computer software systems can be very complicated, and therefore difficult to accomplish. Developers of such systems often need to be familiar with a wide range of technologies for describing and implementing complex software systems, including modern object-oriented programming languages, XML and specific schemas, specific query's and transformations schemes, scripting languages, interface definition languages, process description languages, database definition and query languages, and more. For example, a typical web-based computer software system might include application logic written in an object-oriented programming language, XML for transmission of data between computer software sub-systems, SQL for storing and retrieving data in databases, and WSDL for describing the interfaces to web-based services. There are complexities, involved in getting such technologies to work effectively together, without even considering the business problem to be solved for the end user.

Translating from the requirements of a business problem to an implemented distributed solution using these technologies typically requires a good understanding of each of the various architectures and protocols that make up the solution. Furthermore, end-users expect the resulting software system to be fast, available, scalable, and secure even in the face of unpredictable demand and unreliable network connections.

SUMMARY

In areas other than software development, such as electronic consumer products, industrial manufacturing processes have enabled manufacturers to deliver products that have a high degree of reliability at low cost, coupled increasingly in many cases with the ability to have items customized to satisfy individual needs. Building mechanical or electronic systems involves the coordination of a complex chain of manufacturing steps, many of which are wholly or partially automated. It can be useful for computer software system developers to apply manufacturing-like principles to the construction of software.

This can be accomplished, at least in part, by raising the level of abstraction for describing computer software systems. Abstractions can be used in connection with a modeling language to build computer design models that represent a problem domain that is being addressed by a particular computer software system, instead of focusing on one particular technological problem, such as programming, data interchange or data storage. Generally speaking, a model is a computerized representation in which each element in the representation corresponds to an element or concept in a given domain. Models allow a problem to be precisely described in a manner that avoids delving into technological detail, and they allow the problem to be described using terms and concepts that are familiar to people who work in the domain of the problem, rather than in terms only familiar to information technology experts. Models thus can be used to help bridge the gap between business and technology.

In embodiments of the invention, models are used to capture high-level information that is otherwise typically expressed informally. Models can be used to facilitate the manual development of executable programs, or can be used to automatically implement executable programs. The latter is beneficial because with the manual approach, high-level information can get lost in low level artifacts, such as source code files, where it is difficult to track, maintain or enhance consistently.

Furthermore, information captured by models can be used to efficiently assist the creation and modification of interrelated computer designs by concurrent developers. One implementation of the present invention, includes a visual modeling environment that provides computer software system developers the ability to easily create computer design models that express the behavior of an intended computer software system. The implementation also includes a application generator that further translates the computer design models into an actual computer software system. Each design model is structured and transmitted between the visual modeling environment and an application generator in XML format. Each model typically includes a set of sub-models expressing distinct aspects of the system, including (a) a set of user navigation sub-models that define the way end-users will interact with the computer software system; (b) a set of business rule sub-models that define the data processing rules to be executed upon user interaction; (c) a set of data transmission sub-models that define data message formats to be carried among models and sub-models within a computer software system; (d) and a set of entity-relationship sub-models that define how data is structured in persistent repositories.

Each of the sub-models and their component elements can be translated by the application generator into appropriate artifacts to be jointly deployed into an application server system and a relational database management system for execution, as appropriate. The visual modeling environment provides computer design model developers the ability to easily identify and accept or reject modifications to a computer design model or other related computer design models, using an intuitive graphical user interface, prior or after regenerating the computer design model into a new actual implementation of the intended computer software system. These and other advantages of the invention will appear more clearly from the following detailed description.

In general, in one aspect, an embodiment of a method for facilitating the modification of computer design models that each define a software program facilitates the modification of design models that are affected by a change to another design model. The method includes receiving a modified computer design model that is a modification of an original design model. The method includes comparing the modified design model with the original to identify changed elements, and identifying design models other than the modified design model that are dependent on the changed elements of the modified design model. The method also includes facilitating the modification of the identified other design models to accommodate the changed elements. Various embodiments can include the following details and variations.

The method can include, prior to the receiving step, the step of facilitating the modification of a computer design model by displaying a graphical representation of the design model. The graphical representation can enable changes to be made to the model. The method can include, prior to the receiving step, the step of creating referencing elements to other computer design models from the said computer design model. For example, a model can reference elements of another model, and these referencing elements can be specified.

The method can include, prior to the receiving step, the step of storing information about the design model in file, for example an XML format file. The method can also include the step of automatically generating an executable program for use in an application server system in response to the modified design model. The method can also include automatically generating a persistent data structure description, for example, a database schema and/or database table, for use in a relational database system in response to the modified design model.

In one embodiment, the computer design model includes a data persistency sub-model containing entity elements that define one or more data structures for storing data operated on by the said software program, a data structure sub-model containing structure elements defining one or more hierarchical data structures for transmitting information from and to the said software program, and a behavior sub-model containing action elements that define a set of sequential and conditional instructions that define a business rule of the said software program.

In one embodiment, the method includes, prior to the comparing step, the step of storing the modified computer design model in a source control repository. This can be accomplished by one or more of the following steps: creating a new version record in the source control repository; storing an XML file in the source control repository such that it is attached or related to the new version record; extracting the design model interface specifications in XML format; storing the design model interface specification in the source control repository attached to the new version record; extracting a list of other design models to which the design model includes references to; and storing the list of other design models to which the design model includes references to, attached to the new version record.

The source control repository can be based on a relational database. The step of extracting the design model interface specifications in XML format can include one or more of the following sub-steps: generating an in memory representation of the model; searching the in memory representation of the model to find elements defined as interface elements; creating an XML element in the said design model interface specification for each entity interface; creating an XML element in the said design model interface specification for each structure interface; and creating an XML element in the said design model interface specification for each action interface.

The step of extracting a list of other design model models to which the design model includes references to can include creating an in memory representation of the model; searching the in memory representation of the model to find referencing elements; and querying the source control system about the referenced other computer design model in response to the referencing elements.

The step of comparing the modified design model includes the sub-steps of retrieving the original design model interface specification, parsing the original design model interface specification to create a first in memory representation of the design model interface specification; retrieving the modified design model interface specification; parsing the modified design model interface specification to create a second in memory representation of the design model interface specification; comparing the first and the second in memory representations to identify any elements that are deleted in the representation of the modified design model; and comparing the first and the second in memory representations to identify any elements that are changed in the representation of the modified design model.

The step of identifying design models other than the modified design model that are dependent on the changed elements can include one or more of the following steps: receiving a list of deleted or changed elements in the modified version of the design model; retrieving a list of other design models that include references to the original design model from the source control system; and determining which other design models include references to the deleted or changed elements in the modified version of the design model.

The step of facilitating the modification of the identified other design models can include one or more of the following steps: receiving a list of other design models that depend on the deleted or changed elements in the modified version of the design model; displaying the list of design models for review and selection; and upon user command, providing each of the design models for modification of said referencing elements.

A system for implementing the method can include software running on a programmable computer. For example, the system can includes a receiving module for receiving a modified computer design model that is a modification of an original design model. The system also can includes a comparison module for comparing the modified design model with the original to identify changed elements, and and identification module for identifying design models other than the modified design model that are dependent on the changed elements of the modified design model. The system also can include a facilitation module for facilitating the modification of the identified other design models to accommodate the changed elements. Each of these modules can be implemented in software and or hardware, on the same or on different computers, as appropriate for the implementation. These modules can also be provided in the form of computer code stored in a computer-readable medium.

In general, in another aspect, a method for providing a first computer design model includes determining whether any references are changed or missing. This allows a developer to be notified about the changed or missing references, for example, at the time that the first computer design model is provided.

In one embodiment, a method for providing a first computer design model includes identifying references in the first computer design model to elements of other computer design models; locating the most current interface specifications for the identified references to elements of other computer design models; comparing the most current interface specification for the elements of other computer design models with previous interface specifications for the elements of other computer design models; and determining, in response to the comparing step, whether any references in the first computer design model to elements of other computer design models are changed or missing.

The first computer design model may be stored in a source control repository. The first computer design model may include referencing elements to other computer design models.

The method also includes, prior to the step of identifying references, the step of specifying a version of a computer design model to be provided, by displaying a graphical representation of the source control repository content.

In one embodiment, the step of identifying references includes retrieving the first computer design model from the source control repository; and parsing the first computer design model to list said referencing elements to other computer design models.

In one embodiment, the step of locating the most current interface includes receiving a list of referencing elements to other computer design models; querying the source control repository for the list of other design models, whose interface is being referenced; and retrieving the interface specification of the most recent version of each of the other design models.

In one embodiment, the step of comparing the most current interface step includes receiving the current interface specification for each of the referenced other design models and parse them to create in memory representation of the other design models interface specification; extracting the first design model element interface specifications and parse them to create an in memory representation of the first design model expected interface specifications to referenced elements; and comparing the first design model element interface specifications with the other referenced design models interface specifications.

In one embodiment, the step of determining whether any references are changed or missing step includes receiving the other design models current element interface specifications that are changed or missing; facilitating the substitution of the interface specifications to referenced elements in the first design model with the current interface specification to referenced elements in other design models; and automating the substitution of the references to the interface specifications accordingly to the current interface specifications.

A system for implementing the method can be implemented with software running on a programmable computer. For example, the system can include an identification module for identifying references in the first computer design model to elements of other computer design models; a location module for locating the most current interface specifications for the identified references to elements of other computer design models; a comparison module for comparing the most current interface specification for the elements of other computer design models with previous interface specifications for the elements of other computer design models; and a determination module for determining, in response to the comparing step, whether any references in the first computer design model to elements of other computer design models are changed or missing. Each of these modules can be implemented in software and or hardware, on the same or on different computers, as appropriate for the implementation. These modules can also be provided in the form of computer code stored in a computer-readable medium.

In general, in one aspect, a method for facilitating collaborative use of a computer design model, includes receiving a specification for a file containing a computer design model. The specification identifies the file's computer network location. The method also includes determining whether the computer design model in the specified file is the version most recently stored in a repository. The most recently stored version may be the most recently published version, meaning that the executable code generated from that model is published to the web site and may be in operation. If the version of the computer design model in the specified file is not the most recently stored, the method includes facilitating the selection of elements of the computer design model in the specified file, and elements of the most recently stored version.

In one embodiment, upon determination that the computer design model in the specified file is the not the most recently stored in a source control repository, the user is provided with the choices of editing the version of the computer design model in the specified file, downloading the most recently stored version, and merging the version of the computer design model in the specified file with the most recently stored version. In one embodiment, the step of facilitating the selection of elements is performed upon the user choice of merging the version of the computer design model in the specified file with the most recently published version.

Optionally, prior to the step of determining whether the computer design model is the most recently stored, the method can include facilitating the selection of a repository by prompting the user to select a repository available on a computer network.

In various implementations, the file can include any useful data for the purposes described here. In one implementation, a file containing a computer design model includes a list of design model history descriptors, each of them comprising information about a user who provided the design model version to be stored, a moment in time when the design model version was provided to be stored; and a repository where the design model version was stored.

In one embodiment, the method includes annotating a computer design model with version information, for example by assigning a global unique identifier to the design model and/or by annotating the design model with a history descriptor, including a timestamp of the creation, a base version number and an identification of the user who created the design model.

In one embodiment, the method includes determining whether the computer design model is the most recently published by retrieving the file comprising the computer design model from a specified computer network location, parsing the file to extract a design model global unique identifier and a first design model history descriptor, querying a repository for the most recently stored version of the design model using the extracted design model global unique identifier, parsing the most recently stored version of the design model to extract a second design model history descriptor, and comparing the first history descriptor with the second history descriptor to determine whether the computer design model in the specified file is different from the most recently stored version.

In one embodiment, the step of facilitating the selection of elements of the most recently published version also may include presenting a comparison of the elements of the first computer design model with the elements of the second computer design model, facilitating selection of elements in the second model for merging into the first model, presenting an indication of the merging action to be taken for each selected element, and taking the indicated action, thereby merging the first version with the second version. Facilitating the selection of elements of the most recently published version may include presenting a visual comparison of the elements, for example, a visual indication of new elements, changed elements, and deleted elements. The indicated action may be taken upon user confirmation.

A system for facilitating collaborative use of a computer design model when opening the design model may include software and/or hardware implementations of any or all of the above elements. For example, the system can be implemented with software modules running on a computer. The system may include a receiving module for receiving a specification for a file containing a computer design model, a determining module for determining whether the computer design model in the specified file is the version most recently stored in a repository, and a facilitation module that, upon a determination that the version of the computer design model in the specified file is not the most recently stored, facilitates the selection of elements of the computer design model in the specified file, and elements of the most recently stored version.

In general, in another aspect, a method for merging a first version of a computer design model with a second version of a computer design model includes presenting a comparison of the elements of the first computer design model with the elements of the second computer design model, facilitating selection of elements in the second model for merging into the first model, presenting an indication of the action to be taken for each selected element, and taking the indicated action, thereby merging the first version with the second version.

The computer design model may contain one or elements that can be merged, and can include a data persistency model comprising entity and attribute elements that define a data structure for storing data from the software program, a data structure model containing structure and attribute elements that define an hierarchical data structure for transmitting information from and to the software program, a behavior model containing action elements that define a set of sequential and conditional instructions that define a business rule of the software program, and a user navigation model containing screen elements that define the visual and interactive content for presenting information to the end-user of the software program.

The elements can be presented visually, for example as a list of new elements, a list of deleted elements, a list of local changed elements, a list of foreign changed elements and a list of conflict elements. The elements of the first version may be presented in a first visual list, and the elements of the second version in a second visual list. The elements of the first and second lists may be annotated with specific visual marks that denote the element status, as one of new, changed or conflict, and the elements of the first and second lists annotated with specific visual marks that denote non-existing elements, including marks in the first list for elements that are deleted in the second list and marks in the second list for elements that are new in the first list. The method may also include selecting all the elements of the first list automatically, and upon user selection of elements or non-existing elements in the second list, updating the first list with specific visual marks that denote the merge action to be taken, as one of merge, remove or replace.

Taking the indicated action, thereby merging the first version with the second version may include determining which new elements of the second list are selected, merging the corresponding element of the second version into the first design model version, determining which deleted elements of the second list are selected, removing the corresponding element from the first version, and determining which changed or conflict elements of the second list are selected, replacing the corresponding element of the first version with the corresponding element of the second version.

A computer design model can be stored in a persistent repository. Upon creation, a global unique identifier may be assigned to the model, as well as history descriptor information. The computer design model can be annotated with version information upon modification, and annotated with history descriptor information that includes a timestamp of the modification and an increment to the version number of the previous most recent history descriptor.

Elements can also be annotated with version information, such as a global unique identifier and a version tag, the version tag including, for example, a timestamp of the creation and a base version number. Upon modification, a computer design model element can be annotated with version information, replacing the version tag of the element with a new version tag, for example, including a timestamp of the modification and an increment to the previous version number.

The visual comparison of elements described above can be performed by receiving the second version of the computer design model, comparing the version history descriptors of the first and second versions to obtain a baseline history descriptor, and comparing the version tags of the elements of the first and second versions to provide a list of new elements, a list of deleted elements, a list of local changed elements, a list of foreign changed elements and a list of conflict elements. The step of comparing the version history descriptors may include parsing the first version to extract a first list of version history descriptors, parsing the second version to extract a second list of version history descriptors, and comparing the first and the second lists of version history descriptors to determine the baseline history descriptor as the most recent history descriptor that is present in both lists.

The step of comparing the version tags of the elements may include parsing the first version to extract a first list of elements, comprising all elements in the first version, parsing the second version to extract a second list of elements, comprising all elements in the second version, and comparing the global unique identifiers of the elements in the first and second lists to obtain the list of new elements, including all elements that are exclusively present in the first list, comparing the global unique identifiers of the elements in the first and second lists to obtain the list of deleted elements, including all elements that are exclusively present in the second list, comparing the first and the second lists to obtain the list of local changed elements, including all elements that are present in both the first and the second lists, where the timestamp in the version tag of the element in the first list is ulterior to the baseline version history descriptor timestamp and the timestamp in the version tag of the element in the second list is prior to the baseline version history descriptor timestamp, comparing the first and the second lists to obtain the list of foreign changed elements, including all elements that are present in both the first and the second lists, where the timestamp in the version tag of the element in the first list is prior to the baseline version history descriptor timestamp and the timestamp in the version tag of the element in the second list is ulterior to the baseline version history descriptor timestamp; and comparing the first and the second lists to obtain the list of conflict elements, including the elements that are present in the first and the second lists, where both the timestamps of the version tags of the element in the first and the second lists are ulterior to the baseline version history descriptor timestamp.

A system for facilitating collaborative use of a computer design model when opening the design model may include software and/or hardware implementations of any or all of the above elements. For example, a system for merging a first version of a computer design model with a second version of a computer design model includes comparison module for presenting a comparison of the elements of the first computer design model with the elements of the second computer design model, a selection module for facilitating selection of elements in the second model for merging into the first model, and indication module for presenting an indication of the action to be taken for each selected element, and an action module for taking the indicated action, thereby merging the first version with the second version.

BRIEF DESCRIPTION OF THE DRAWINGS

Embodiments of the present invention are illustrated by way of example, and not limitation, in the following figures.

The drawings are not necessarily to scale, emphasis instead generally being placed upon illustrating the principles of the invention.

In the following description, numerous specific details are set forth in order to provide a more thorough understanding of the present invention. It will be apparent, however, to one skilled in the art, that the present invention may be practiced without, or with a variation on, these specific details.

Moreover, the system and methods can be implemented using software that is stored on one or more processor-readable storage mediums and executed using one or more processors. Each of the identifiable software components can be executed by the same or distinct processors communicating across a distributed network of computers, or some combination. For example, the visual modeling environment described below can be executing using a processor and the application generator described below can be executed using another processor.

Reference in this specification to "one case" (e.g. one embodiment, one implementation, etc.) means that a particular feature, structure, or characteristic described in connection with the case is included in at least one case of the invention. The appearances of the phrase "in one case" in various places in the specification are not necessarily all referring to the same case, nor are separate or alternative cases mutually exclusive of other cases. Moreover, various features are described which may be exhibited by some cases and not by others. Similarly, various requirements are described which may be requirements for some cases but not other cases.

DETAILED DESCRIPTION

Figure 1:
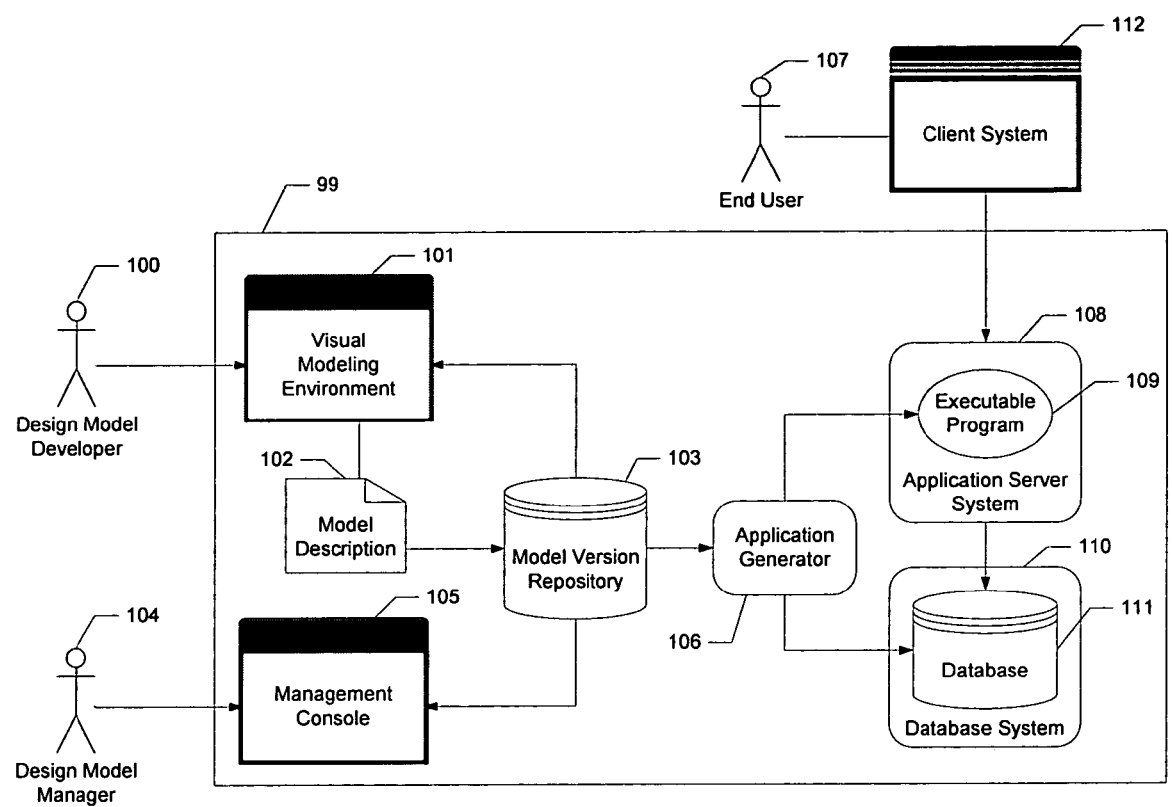
FIG. 1 is a block diagram of an embodiment of a computer software design model processing system according to the present invention.

FIG. 1 is a block diagram of an implementation of a computer software design models processing system 99. A design model developer 100, a person who is designated with the task of designing computer software design models, uses a visual modeling environment 101 to edit, generate and modify computer design models using a graphical user interface. The visual modeling environment 101 facilitates the visual construction and modification of the computer design models in a user friendly and intuitive way. For example, the visual modeling environment 101 may allow a user to visually select elements of a model, and connect them as desired. The visual modeling environment 101 can be a software program running on a developer's 100 computer, or can be software running on a server (e.g., accessed via a browser), or some combination. In one implementation, the modeling environment 101 is a combination of a software program running on a developer's computer and a set of software services running on a server being accessed by the modeling environment.

Computer design models 102 describe, using abstractions, the intended behavior of a computer software system. Examples of functionality provided by such computer software systems include: login verification, notification, database storage, order processing, electronic wallet, calendar/scheduler, directories, news and information, and so on. This functionality can be combined with other functionality to support business processes. Using the modeling environment 101, it is possible for a developer 100, to model distinct aspects of a computer software system, such as (a) the user navigation and user interface content to be presented to end-users; (b) the business rules that apply to the execution of the interactive events triggered by the end-user; (c) and the data transmission and data repository formats and relationships that support the execution of the application. These distinct aspects, in some implementations, can describe the intended behavior of the computer software system.

Once a model is designed, it is compiled into a model description document 102 to be submitted to a model version repository 103. The visual representations of the models in the modeling environment 101 are translated into a structured representation used for processing by other components of the system 99. The modeling environment 101 is responsible for creating a model description 102 document from visual representations. As described below, the model description document 102 can be generated at various times, for example when a developer 100 triggers the submission of a model to the model version repository 103.

In one embodiment, the model description 102 document is structured using XML (extensible Markup Language). XML is a language that can be used to describe information, or to make information self describing, and which can facilitate mapping of visual models into a structured representation that can be parsed by other components of the system 99.

The version repository 103 stores the model descriptions 102. By storing versions as development progresses, the repository retains information about how and when a computer design model changed over time. For each model, a model description 102 is stored along with information about the evolution of the model. At any point in time, an authorized developer 100 can add a new version of a model to the version repository 103. Additionally, the version repository 103 is integrated with the visual modeling environment 101 to support collaboration among concurrent developers 100. In the simplest case, one single developer 100 adds revised versions of a computer design model to the version repository 103. In more complex implementations, multiple developers 100 retrieve and add distinct versions of a computer design model to and from the version repository 103. In such scenario, the modeling environment 101 can assist the developers 100 to accept or reject modifications performed by others such that a coherent version is stored in the version repository 103 that can supersede other versions.

The model version repository 103 is preferably based on a database server such as Microsoft SQL Server or Oracle Database and accessed via software services hosted in an application server system. These software services provide to the modeling environment 101 means to submit and retrieve models as well as to submit and retrieve information about repository 103 content.

In the context of the model processing system 99, an application generator 106 may be used to translate computer design models into an implementation of a computer software system. An implemented computer software system may include: an executable program 109 to run into an application server system 110, and a database definition 111 to be hosted in a relational database system 110. The user navigation and user interface aspects, as well as the business rule and data transmission aspects of the model, are translated into the executable program 109. The executable program can be any executable or interpreted program, for example a web application targeting the .NET.™ platform from Microsoft Corporation or the Java 2 Enterprise Edition (J2EE) platform developed by Sun Microsystems.

The data repository aspects of the computer software system are translated into a database 111. The database can be any sort of relational database, for example a Microsoft SQL Server or an Oracle database. Given the nature of the intended computer software systems, and the level of abstraction provided, the generated Executable Program 109 is automatically configured to access the Database 111 according to the computer design model specifications.

Once the executable program 109 and the database 111 are available on the model processing system 99, respectively in the target application server system 108 and the relational database system 110, the application server system 108 can handle requests from end-users 107, for example, using a Hyper Text Transfer Protocol (HTTP) client 112, typically a Web Browser. This means that the elements in the model that denote the way end-users see and interact with the computer software system are generated as code, for example web pages that are hosted in an application server system 108 and served via HTTP to a client 112. A request generates a response that takes the form of a graphical user interface to be displayed in the client system 112. Some controls embedded in the graphical user interface may react to subsequent user generated events, and cause the browser to generate subsequent requests back to the application server system 108. For example, when a user presses a button visible in the client system 112, a form may be submitted to the application server system 108 that in response provides the content of a new interactive form to the client system 112.

Visual Modeling

In one embodiment, three types of sub-models are used to model a computer software system: (a) entity-relationship sub-models; (b) user-navigation sub-models; (c) business rule sub-models. Each of these sub-models contain details about the intended computer software system behavior, each of them modeling a different perspective with accurate abstractions that are directly related with the business domain and can be translated into an actual implementation to be hosted in a system including an application server system and a database system.

In order to better illustrate the present invention, an exemplary problem domain is presented, namely a computer software system to handle the registration of citizens of a country to store information about persons and cities and information about which persons live in which cities. The system also stores each person's name and age, as well as each city's name and population. The system enables listing, inserting and editing persons into a database using a graphical user interface. Every time a new person is inserted the population of the city where the person lives is incremented.

In one embodiment, a computer software system model can be composed of several sub-models, each of them providing one perspective of the computer software system under development, modeled using distinct modeling languages. The underlying model integrates such perspectives so that a self-consistent computer software system can be analyzed and built.

In the case of the illustrative example, the complete problem is expressed within a model composed of three sub-models. The complete design model for the intended computer software system includes, at least, an entity relationship sub-model (as presented in FIG. 2), a user interface navigation sub-model (as presented in FIG. 3) and a business rule sub-model (as presented in FIG. 4).

Entity-Relationship Sub-Models

Figure 2:
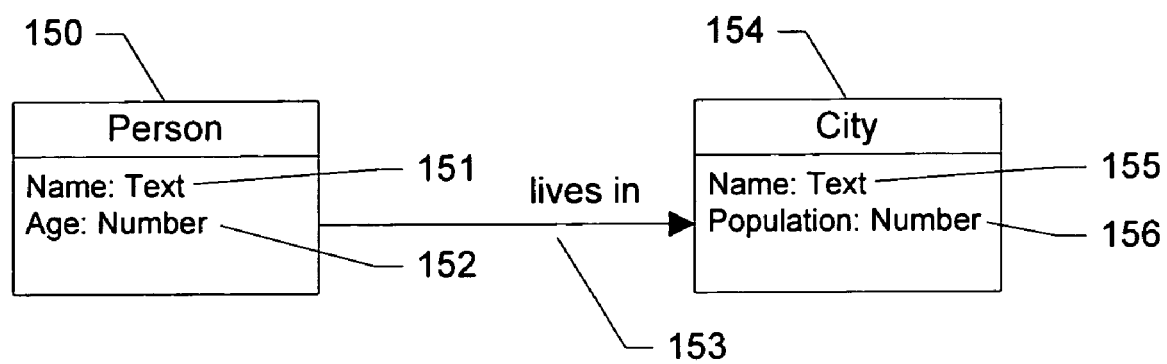
FIG. 2 is a demonstrative example of a portion of computer design model depicting an entity-relationship diagram.

Referring to FIG. 2, a type of model sometimes used to model a business domain is the entity-relationship diagram. An entity-relationship diagram, like the example shown, is a specialized graph that can illustrate, for example, the structure for a persistent database, resembling the graphical breakdown of a sentence into its grammatical parts. Entities are rendered as rectangles 150 and 154. Relationships are portrayed as lines 151 connecting the rectangles 150 and 154. In a logical sense, entities are the equivalent of grammatical nouns, such as persons or cities. Relationships are the equivalent of verbs or associations, such as the act a person living in a city. Therefore, the problem domain of "storing information about all persons and cities and the information about which persons live in which cities" can be modeled with a diagram such shown in the figure. The "Person" entity 150 and the "City" entity 154 are connected by means of the "lives in" relationship 153, associating each "Person" with a "City".

The figure also shows the data to be associated with each entity as entity attributes (151, 152, 155 and 156). The entity "Person" 150 contains two attributes: the "Name" 151 and the "Age" 152. The entity "City" 154 contains two attributes: the "Name" 155 and the "Population" 156.

The same problem domain could have been expressed correctly using the Standard Query Language (SQL) as presented below, which is commonly used in conjunction with relational database management systems (RDBMS) to handle persistent data representations.

```
CREATE TABLE CITY {
    NAME CHAR (200),
    POPULATION INT,
    CONSTRAINT CITY_ID PRIMARY KEY (
        NAME
    )
};
CREATE TABLE PERSON (
    NAME CHAR (200),
    AGE INT,
    LIVESIN CHAR (200),
    CONSTRAINT PERSON_LIVES_IN FOREIGN KEY (
        LIVESIN
    ) REFERENCES CITY (
        NAME
    )
);
```

Unlike the visual model in FIG. 2, the SQL textual representation is bound to the technical implementation of a RDBMS. There is no direct mapping for nouns and verbs into an SQL construct. Using a model processing system, such as the system of the present invention, it is possible to define a direct mapping between the visual representations in the entity-relationship graph into an SQL textual representation, enabling developers to create, read, test and modify concrete computer software systems directly from design models in a much more efficient way, focusing on the business domain (like an entity-relationship diagram) instead of the technology domain (like SQL and RDBMS).

Entity-relationship diagrams may not be enough to model an entire computer software system since they are only sufficient to represent how the several entities that support the execution of that computer software system are organized and interrelated in a persistent repository.

User Navigation Sub-Models

A developer 100 benefits from being able to express how data shall be presented and organized to the end-user of a computer software system, for instance in a web page. A developer also benefits from an ability to express which business activity the computer software system shall take in response to user interaction. It also can be useful to model other parts of the problem domain such as: "listing, inserting and editing persons into the database using a graphical user interface" and "every time a new person is inserted the population of the city where the person lives must be incremented".

Figure 3:
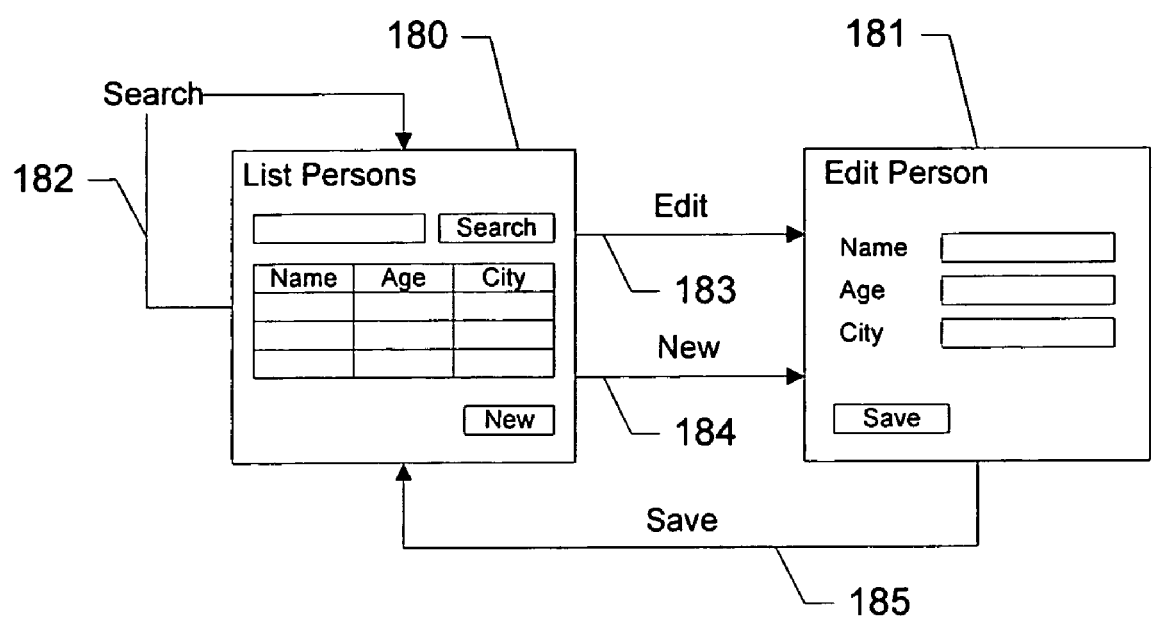
FIG. 3 is a demonstrative example of a user navigation sub-model.

The user navigation sub-model of FIG. 3 comprises two nodes 180 and 181 that represent two web pages, a first web page 180, called "List Persons" for listing "Person" entity data and a second web page 181 called "Edit Person" for editing an individual record of "Person" entity data. The sub-model also includes four relationships representing transitions between pages upon user interaction. The transition 182, called "Search", from the first page to the same first page, presents a new result set of person records upon a search criteria input by the end user. A second transition 184 called "New" from the first web page to the second web page, presents an edit form to input a new "Person" entity record. A third transition 183, called "Edit" from the first to the second web page, presents an edit form to update one "Person" entity data record. A fourth transition 185, called "Save" from the second to the first web page, stores a "Person" entity data record according to data input in the second web page.

Referring briefly again to FIG. 1, the user navigation sub-model describes how an end-user 107 interacts with the application server system 108 to perform the intended business functions of the computer software system. Using a computer software system derived from the sub-model in FIG. 3, the application server system 108 could, for example, handle requests from an end-user 107 using a Hyper Text Transfer Protocol (HTTP) based client system 112, like a Web Browser. A request generates a response that takes the form of a graphical user interface to be displayed in the client system 112. The returned user interfaces are directly derived from the modeled content of a sub-model node (representing a web page) in the user navigation sub-model. Some of the embedded controls react to subsequent user generated events, and cause the client system 112 to generate subsequent HTTP requests back to the application server system 108. These subsequent requests will trigger a transition expressed in the user navigation sub-model. In response to the new request a new response is sent, containing the content of web page node that is the destination of the represented transition.

For example, given the sub-model in FIG. 3, an end-user 107 posts an initial request to the application server system 108, requesting access to web page 180, indicating a well-known Unified Resource Locator (URL), like for example, http://server/citizens/listpersons.aspx. The application server system 108 directs the request to the executable program 109 that implements the corresponding computer design model. The executable program renders the content of the web page 180 and sends it to the end-user's client system 112. The end-user 107 interacts with the web page. For example, if the end-user 107 presses the "New" button, a request is submitted back to the application server system 108 to be directed to the executable program 109, given that the model expresses a transition to web page 181. The executable program 109 renders the content of the edit web page 181 and sends it back to the end-user's client system 112.

Business Rule Sub-Models

Figure 4:
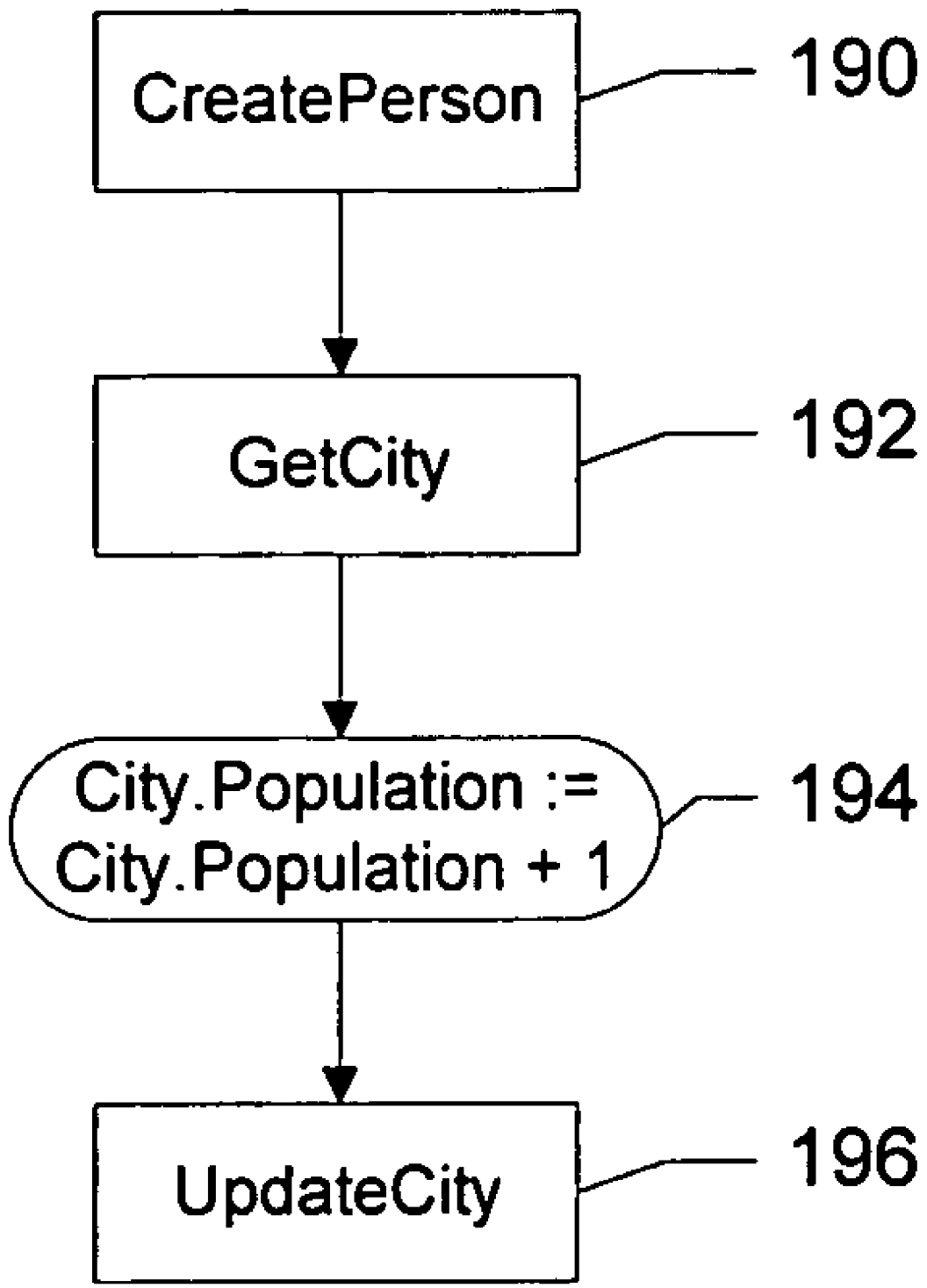
FIG. 4 is a demonstrative example of a business rule sub-model.

An example business rule shown in FIG. 4 is associated with the "Save" transition 185 in FIG. 3. When the end-user presses the "Save" button in the "Edit Person" web page resulting from node 181 of the user-navigation sub-model in FIG. 3, the business rule represented by the sub-model in FIG. 4 will be executed by the executable program 109. The business rule sub-model demonstrated in FIG. 4, includes four nodes 190, 192, 194 and 196 that represent instructions about how the computer software system updates the database data upon user navigation from the first web page 180 to the second web page 181, upon selection of the "Save" operation 185 by pressing a button or a hyperlink. The relationships among the nodes in FIG. 4 represent the sequence of execution of the instructions in the context of the business rule. The example business rule is as follows: (a) create a new person record, invoking "CreatePerson" 190; (b) step through to obtain the current data about the city where the person lives invoking "GetCity" 192; (c) increment the population attribute of the city record" (e.g.) instruction "city.population:=city.population+1," 194; and (d) store the updated record of the city in the database invoking "UpdateCity" 196.

The execution of business rule sub-models is associated with events represented in the user navigation sub-model.

Some of the elements available in a business rule modeling language can enable the easy handling and transformation of data according to the entity-relationship sub-models. In the example of FIG. 4, the elements 190, 192 and 196 represent data access instructions. Element 190 enables the creation of record of data into a database table derived from the "Person" entity 150 in FIG. 2. Element 192 enables the retrieval of one record of data from the database table derived from the "City" entity 154 in FIG. 2. Element 196 enables the update of one record of data into the database table derived from the "City" entity 154 in FIG. 2.

Referring again to FIG. 1, as the end-user 107 posts requests to the application server system 108 triggering events using the user interface presented in the client system 112, if any business rule is associated with the triggered event, the corresponding implementation in the executable program 109 will be executed.

Visual Modeling Environment

In one embodiment, a modeling environment 101 (FIG. 1) presents computer design model and sub-models using a visual paradigm and stores the computer design models in a model description documents 102.

Figure 5:
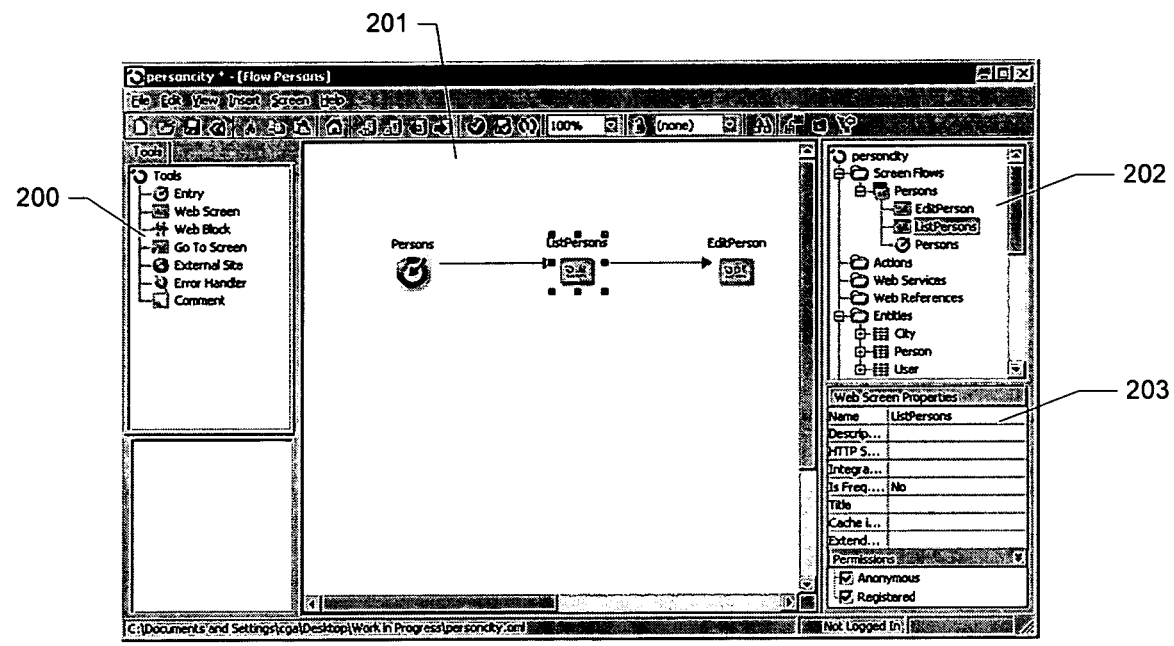
FIG. 5 is an exemplary screen display of one implementation of a visual modeling environment.

In one implementation of the visual application modeling environment, here shown in FIG. 5, editing a model comprises editing each of the sub-models that compose the model, one at a time, within a model canvas 201, that presents the sub-model according to a modeling language. Each type of sub-model may be described using a distinct modeling language.

In order to create the sub-models, the developer 100 uses a set of available constructs in a palette 200. These constructs can be dragged from the palette 200 into the model canvas 201 to create a new element in the sub-model. Once created in the model canvas 201, elements can be connected to establish relationships according to the modeling language. Depending on the type of sub-model being edited in the model canvas 201, the palette will only present the relevant specific constructs for the specific modeling language. For example, while editing a user-navigation sub-model, the palette will include constructs such as screens.

Following the example presented in FIG. 3, the model canvas 201 displays a graph depicting a series of web pages (the nodes) and possible navigation paths (the line connectors) among the web pages. Double-clicking the elements in the model canvas 201 results in the presentation of, dedicated editors that allow the developer to further define the behavior and semantics of the element. In the example of FIG. 5, the content of each web page in the model canvas 201 is not presented in detail. The content can be edited by selecting (e.g., double-clicking), each of the nodes of the graph that represent each of the web pages. In such a situation, the model canvas can include a "What You See Is What You Get" (WYSIWYG) representation for the content of the web page.

In the example implementation of FIG. 5, all elements created in the model canvas 201 are catalogued in model tree 202. Using the model tree 202, a developer can locate and select the context to be presented in model canvas 201, by selecting (e.g., double-clicking), a node of the model tree 202. The model tree 202 is especially useful when editing complex models comprising several sub-models of several types.

Depending on the type of sub-model selected, the context in the model canvas 201 will change. Some of the elements' properties are editable within a property editor 203, allowing the developer to quickly change the element behavior or semantics without having to change the context in the model canvas 201. The property editor 203 is especially useful when editing complex elements of a model that otherwise would have to be visually annotated in the model canvas to describe every detailed aspect of the elements behavior. For example, when specifying a web page, a developer may want to define whether the web page requires automatic end-user authentication, if the content is to be transmitted using encryption, and other specifics.

Design Model Descriptions

Computer design models have proven to be well matched with human expressive patterns, but typically they have not lent themselves to the process of automated processing. It is useful to store the results of editing a model in a well structured format to enable transmitting, versioning, archiving, validating, and transforming the design model into a computer software system. XML (eXtensible Markup Language) can be used to fill that need, by providing the building blocks for storing a visual representation in an open document. Such a document can be used to exchange the variety of data captured in the models and sub-models across the different components of the processing system in FIG. 1, e.g., the modeling environment 101, the version repository 103, and the application generator 106.

In one embodiment, a model description document 102 has a root element called a "Model". The "Model" element contains a set of sub-elements (submodels) that may group the sub-models that define the computer software system. These sub-models include: "Entities," "Structures," "ScreenFlows," and Actions" elements. "Entities" elements represent entity-relationship sub-models. "ScreenFlows" elements represent user interface navigation sub-models. "Actions" elements represent business rule sub-models; "Structures" elements represent data transmission sub-models. As a demonstrative example, the XML below contains some elements that can be found in a model description document 102.

```
<?xml version="1.0"?>
<Model name="sample" id = "ModelA">
  <ScreenFlows/>
  <Actions/>
  <Structures/>
  <Entities>
    <Entity Id = "Entity1" name = "Person" primaryKey =
    "Attribute1" version="1"
        stamp="20050101100000">
      <Attribute id = "Attribute1" name = "Name" type = "Text" />
      <Attribute id = "Attribute2" name = "Age" type = "Integer" />
      <Attribute id = "Attribute3" name = "LivesIn" type = "Entity2" />
    </Entity>
    <Entity Id = "Entity2" name = "City" primaryKey =
    "Attribute4" version="1">
      <Attribute id = "Attribute4" name = "Name" type = "Text" />
      <Attribute id = "Attribute5" name = "Population" type =
      "Integer" />
    </Entity>
  </Entities>
</Model>
```

(In the following descriptions about the contents of model description document, provided for completeness, excerpts are omitted and replaced with the " . . . " symbol.)

Entities

The "Entities" element of a design model contains a set of individual "Entity" elements. A design model can have any number of "Entity" elements, where each "Entity" represents a persistent data repository. Groups of logically associated entities are modeled in an entity-relationship sub-model.

When an application generates a computer software system, it creates a database table that stores the data about the described entity. The table definition is inferred from the "Entity" definition in the model description document. Each "Entity" generates a database table, whose columns are generated from each of the "Attribute" elements within the "Entity".

An "Entity" element for example, can contain the following XML elements:

```
<Model ...>
   ...
   <Entities>
      <Entity id = "..." name="" description="..." primaryKey = "..."
      version = "..."stamp="..." >
         <Attribute id = "..." name = "..." description = "..." type = "..."/>
         ...
      </Entity>
      ...
   </Entities>
</Model>
```

In one embodiment, an "Entity" is defined by a name, which is unique to the "Model", an id that is virtually unique to the entire "Model" universe; a primary key that identifies a key "Attribute" of the "Entity" that will uniquely identify an "Entity" record within a database; a version identifier that is used to support model version comparison, that is incremented whenever any of the "Entity" or "Attribute" attribute value is modified; and a time stamp representing the moment of modification.

Each "Attribute" is defined by: a name, which is unique to the "Entity"; an id that is virtually unique to the entire "Model" universe; and a data type that defines a constraint to the type of data that can be stored in the database column corresponding to the Attribute. Example data types are number, text and date.

A relationship in a design model that relates one first "Entity" with a second "Entity" is stored as an additional "Attribute" of the first "Entity." In such case, the relationship is denoted by the type of that "Attribute," constraining the values that can be stored in the first "Entity," to the existing values of the primary key column records in the table implementing the second "Entity". The following XML excerpt illustrates how relationships can be represented:

```
<Model ...>
   ...
   <Entities>
      <Entity Id = "Entity1" ... >
         ...
         <Attribute id = "..." name = "..." type = "Entity2" />
         ...
      </Entity>
      <Entity Id = "Entity2" ... >
         ...
      </Entity>
   </Entities>
</Model>
```

Looking at the example in FIG. 2, it can be noticed that the description of depicted sub-model includes two "Entity" elements, the first named "Person" and the second named "City." "Person" has three "Attribute" elements called "Name," "Age," and "LivesIn." "City" has two "Attribute" elements called "Name" and "Population."

Structures

The "Structures" element of a design model contains a set of individual "Structure" elements. A design model can have any number of "Structure" elements. Each "Structure" element defines a data structure that can be used to transmit data among elements of a computer design model. Such a data structure can be composed of the definitions of other "Structure" elements, meaning that unlike an "Entity", a "Structure" can define a hierarchical data structure. An example of the use of a "Structure" is a definition for an order processing system. In such an exemplary computer software system, an order is represented by an identifier, a customer record and a list of items being ordered, given that a customer is further represented by a name and customer identifier and that each item is represented by a product identifier, a quantity and an amount. In such case, a "Structure" can be defined to support the transmission of complete order records among sub-models of a model or even to other computer software systems.

Once the application generator 106 generates the computer software system, it creates a series of data definitions that can be used to transmit data among web pages and business rules using the most appropriate format. These formats include web page forms, XML data structures or any other adequate definitions of data tokens to be processed by an implementation of a sub-model or by a third-party computer software system.

The Structure element contains, for example, the following XML elements and attributes:

```
<Model ...>
   ...
   <Structures>
      <Structure name="..." description="..." id = "..." version = "..."
      stamp = "...">
         <Attribute id = "..." name = "..." description = "..."
         type = "..." id = "..."/>
         ...
      <Structure/>
      ...
   </Structures>
</Model>
```

In this example, a "Structure" element is defined by a name, which is unique to the "Model"; and an id that is virtually unique to the entire models universe.

Likewise, each "Attribute" of the "Structure" is defined by a name, which is unique to the "Structure," an id that is virtually unique to the entire models universe; a data type that defines a constraint to the type of data that can be transmitted according to the "Structure" definition; a version identifier used to support model version comparison that is incremented whenever any of the "Structure" or "Attribute" attribute value is modified; and a time stamp representing the moment of modification.

A "Structure" element can be defined by composition of one or more other "Structure" elements if one or more "Attribute" elements of a first "Structure" are of a type defined as "Record of Structure" or a type defined as "RecordList of Structure." Record types define an inclusion of one record of the data defined by the indicated Structure. RecordList types define an inclusion of a sequence of zero or more records of the data defined by the indicated Structure. These constructs can be applied recursively, thus meaning that a "Structure" can define a hierarchical data structure to be transmitted.

The inclusion of a sequence of records of a first "Structure" element within a second "Structure" element is stored as an additional "Attribute" element of the second "Structure" element, whose data type refers to the first "Structure" element. For example:

```
<Model ...>
   ...
   <Structures>
      <Structure Id = "Structure1" ...>
         ...
      </Structure>
      <Structure Id = "Structure2" ...>
         ...
         <Attribute id = "..." name = "..." type = "RecordListStructure1" />
         ...
      </ Structure>
   </ Structures>
</Model>
```

Given again the order processing system example, an order structure could include an Attribute of type "RecordCustomer" and an Attribute of type "RecordListItem."

Actions

The "Actions" element of a design model contains a set of individual "Action" elements. A design model can have any number of "Action" elements. Each "Action" element represents a sequence of procedural rules to be applied to data to be presented, stored or transmitted by the computer software system. Each "Action" defines a business rule sub-model.

When the application generator 106 generates the computer software system, it creates a class method that implements the behavior expressed in the "Action" element design sub-model. An "Action" element, for example, can contain the following XML elements and attributes:

```
<Model ...>
   ...
   <Actions>
      <Action name="..." description="..." id = "..." version = "..." stamp = "...">
         <Parameters>
            ...
            <InputParameter id = "..." name = "..."
            description = "..." type = "..."/>
            ...
            <OutputParameter id = "..." name = "..."
            description = "..." type = "..."/>
            ...
         </Parameters>
         <Nodes>
            ...
         </Nodes>
      </Action>
   </Actions>
   ...
</Model>
```

In this example, an Action is defined by a name, which is unique to the Model; an id that is virtually unique to the entire Models universe; zero or more "InputParameter" elements and zero or more "OutputParameter" elements. These define a data transmission interface that input the "Action" with the universe of data to be processed during its execution (InputParameter elements) and the definition of the expected data to be transmitted back at the end of the processing (OutputParameter elements); a version identifier that is incremented whenever any of the "Action", "InputParameter" or "OutputParameter" attribute value is modified; a time stamp representing the moment of modification; and a series of "Node" elements that express the several instructions to be executed within the action and the sequence of their execution.

Screen Flows

The "ScreenFlows" element of a design model contains a set of individual "ScreenFlow" elements. A design model can have any number of "ScreenFlow" elements. Each "ScreenFlow" contains a set of possibly interrelated "Screen" elements. A "ScreenFlow" can have any number of "Screen" elements. Each "Screen" element represents a web page providing content and possible transitions to other web pages.

Once the application generator 106 generates the computer software system, it creates a dynamic web page (like an Active Server Page or Java Server Page) to be rendered by the application server system. The implementation of the dynamic web page is created given the "Screen" element definition.

The "ScreenFlow" and "Screen" elements can contain the following XML elements and attributes:

```
<Model ...>
   ...
   <ScreenFlows>
      <ScreenFlow id = "..." name = "..." description = "...">
         ...
         <Screen id = "..." name = "..." description = "..." version = "..." stamp = "...">
            <Parameters>
               <InputParameter id = "..." name = "..." description = "..."
               type = "..."/>
               ...
            </Parameters>
            <Content>
               ...
            </Content>
            <Links>
               <Link destination = "...">
               ...
            </Links>
         </Screen>
      </ScreenFlows>
   ...
</Model>
```

In this example, a "Screen" is defined by: a name, which is unique to the model; an id that is virtually unique to the entire models universe; zero or more "InputParameter" element declarations, each of them defining a data transmission interface that indicates to the "Screen" element, the universe of data to be used for presentation during its rendering; a version identifier that is incremented whenever any of the "Screen" or "InputParameter" attribute value is modified; a time stamp representing the moment of modification; a "Content" element that contains all information required by the application generator to create an implementation of an executable program capable of presenting the end-user with a user interface that reassembles the content expressed in the model and supports the user interaction with event triggering controls like buttons and links; and a "Links" section that includes the definitions of user navigation transitions in the models, referring the destination of the transition.

Model Versions Repository

Referring again to FIG. 1, a developer 100 using the modeling environment 101 may decide to save a model description document 102 using the model version repository 103. The processing system 99 allows developers to integrate changes and additions to their models. In some embodiments, the model version repository 103 of the present invention enables developers 100 to use the visual modeling environment 103 to retrieve existing versions of a computer design model; submit new versions of a computer design model; and obtain multiple versions of one design model for visual comparison and merge of elements of both.

The model repository 103 also can be used by the application generator 106 to retrieve a computer design model in order to generate an executable program 109 to be published in the application server system 108 and to apply changes to the database 110.

The model repository 103 can store information about each known design model; each known design model version; and each design model developer and his access rights to each design model.

For each design model, the model version repository 103 stores a model's global unique identifier; a version tag of the most recent version of the model used by the application generator 106 to create an executable program 109; and a Boolean indicator about whether the design model is active for retrieval by the visual modeling environment and generation by the application generator.

For each design model version, the model version repository 103 stores the design model to which the version is an implementation of; a version tag as a number that is incremented whenever a new version of the model is submitted to the repository; the submitted model description document 102; an identifier of the developer 100 who submitted the version; the moment when the version was submitted; and an history of other versions of the model from which the current version was modified.

For each developer 100, the model repository 103 stores a username and an encrypted password for authentication.

For each access right definition, the model repository 103 stores a username, a model identifier and a grant to an access right. For each user/model pair, rights can be granted to allow a developer 100 to retrieve existing versions of a design model or additionally to submit new versions of the design model.

Figure 6:
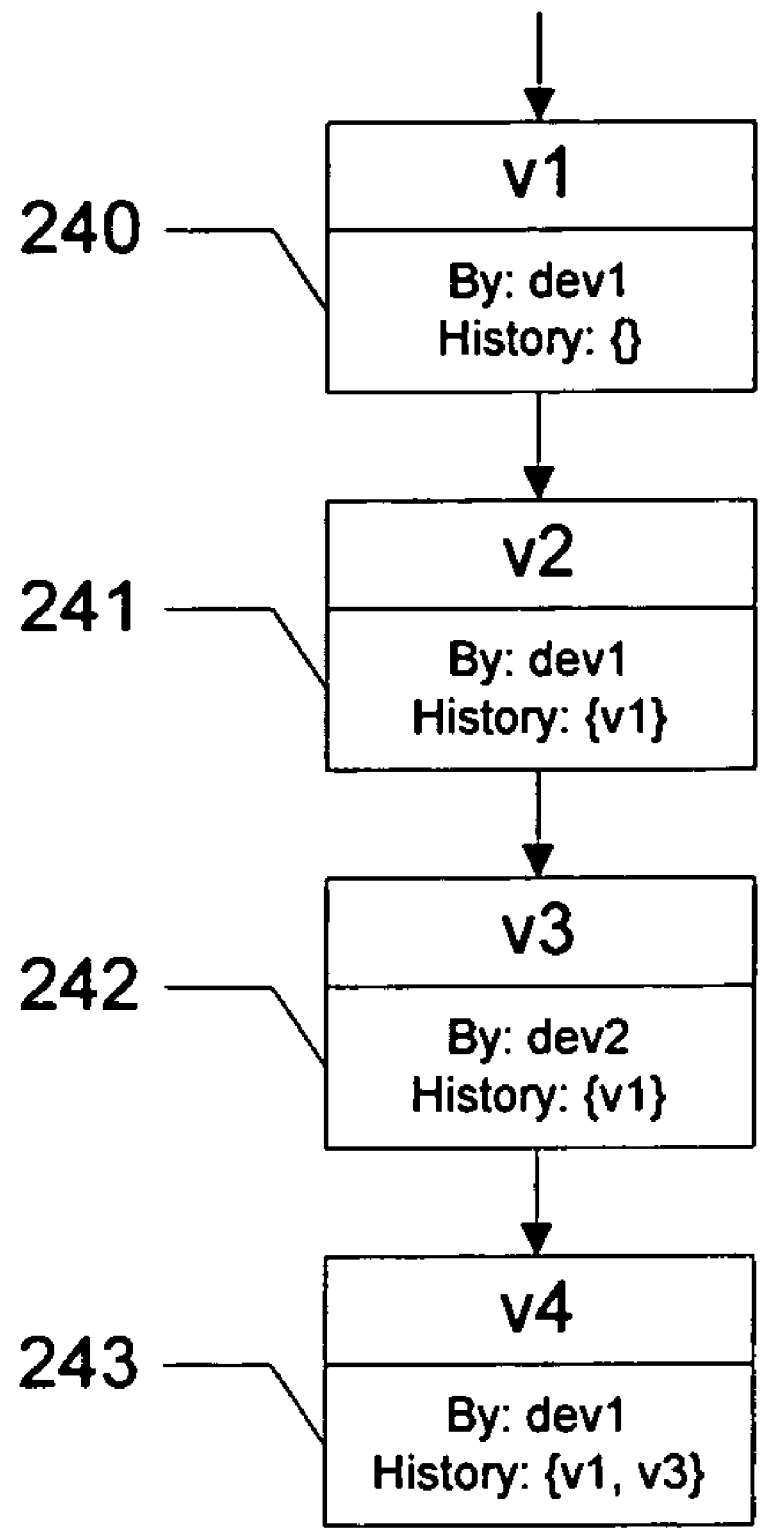
FIG. 6 is a block diagram depicting a demonstrative example of one design model progression in the model version repository.

Referring now to FIG. 6, a demonstrative example of the progression of a design model in the model version repository shows a first version 240 (tagged as "v1") that was created and submitted by the developer with username "dev1." A second version 241 (tagged as "v2") was also submitted by dev1 and was developed after retrieval of version with tag "v1." The third version 242 (tagged as "v3") was submitted by 'dev2,' who started the modifications after retrieving version tagged as "v1." This third version ("v3") supersedes the modifications submitted by "dev1" to "v1." A fourth version 243 (tagged as "v4") is submitted by "dev1" who started the modifications after retrieval of version tagged as "v3."

In some embodiments, the modeling environment 101 facilitates submission of a new version of a design model after modification. The modeling environment 101 also provides developers 100 the ability to retrieve an existing version of a design model for modification, also using the modeling environment 101.

Version Tags

As shown in FIG. 6, the history of the versions of a design model can be tracked within the model repository 103. In order to allow the modeling environment 101 to identify conflicts between versions, a version history is also maintained inside the model description 102 within a "Versions" element. The "Versions" element contains a set of individual "Version" elements. A design model can have any number of "Version" elements. Each "Version" element represents a tagged version of the design model, including a tag number and the date of submission.

The history information can be maintained, for example, using the following structured XML format:

```
<Model ...>
    ...
    <Versions>
        <Version tag = "..." date="..."/>
        ...
    </Versions>
    ...
</Model>
```

For example, when retrieving a model such as the example having the depicted progression, the model description document will include four "Version" elements, each of them representing one of the previously submitted model versions.

The information available within the "Versions" element of the model can be used to detect possible conflicts prior and after the submission of a design model version to the model repository 103.

Generation and Deployment of Computer Software Systems

Figure 7:
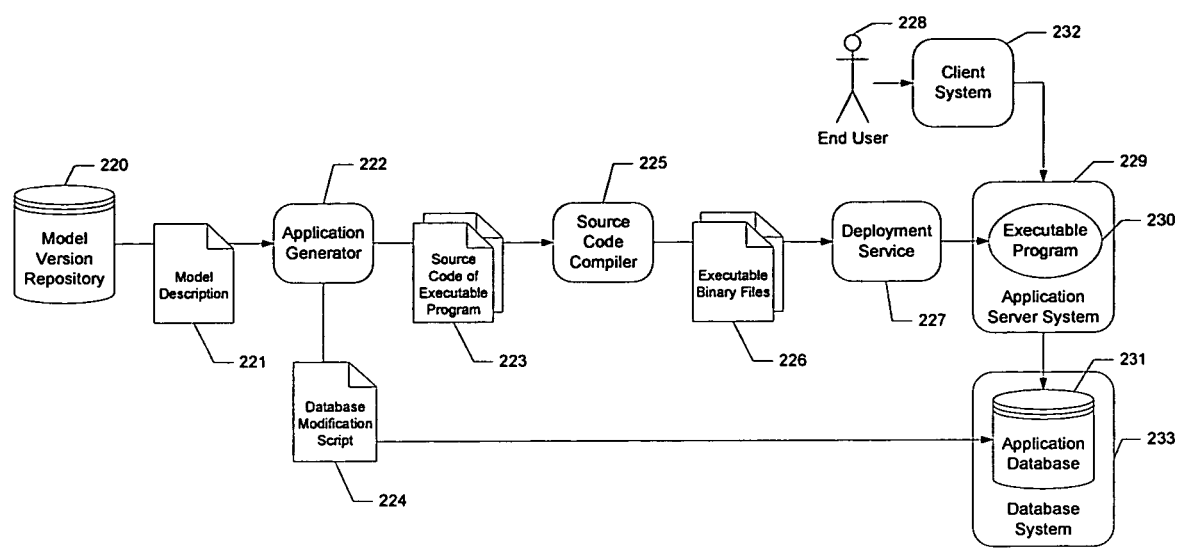
FIG. 7 is a block diagram of an embodiment of an application generation and deployment processing system according to the present invention.

Referring to FIG. 7, a computer design model edited using the modeling environment, can be used to generate and deploy a fully functional computer software system, and this process of generating and deploying the computer software system given a model is supported by the sub-system shown. Referring briefly again to FIG. 1, the sub-system use can be triggered upon a developer 100 request to generate and deploy a model using the modeling environment 101 or upon application manager 104 request to generate and deploy a model, for example using the management console 105.

The process starts by retrieving a model description document 221 from the model repository 220 and providing that document 221 to the application generator 222. The application generator 222 is responsible for parsing the XML content of the model description 221 document into an internal representation. From there on, the application generator 222 applies a series of built-in generation rules and templates that directly support the translation of the model element definitions into source code of a corresponding executable program 223. Depending on the sub-models included in the model description document 221 and translation rules built-in the application generator 222, the source code is output and organized in several files, each containing the source code of the implementation of the several sub-models within a model.

In one example implementation, which targets the Microsoft .NET.™ application server system, user navigation sub-models are transformed into active server pages, business rule sub-models are transformed into C# classes, and entity-relationship sub-models, are transformed into a database modification script 224 to be applied to the RDBMS 233. In the same example implementation, the database modification script contains SQL statements that create the database tables with columns and constraints corresponding to the entity-relationship sub-models.

Right after generating the source code of executable program 223, a native source code compiler 225 is used to create the executable binary files 226 that actually implement the computer software system behavior in a format that can be hosted and managed by an application server system 229. In the example implementation targeting the Microsoft NET.™ application server system, the native C# classes and active server pages are compiled using a reference implementation of a C# language compiler.

Given a database modification script 224, the application generator 222 accesses the RDBMS 233 to create or modify the application database 231.

Once the executable binary files 226 are generated, a deployment service 227 is used to execute all steps of transferring, installing and configuring for execution the executable binary files 228 into the application server system 229. In one example implementation, targeting the Microsoft NET.™ application server system, the deployment service 227 transmits a compressed file comprising all executable binary files 226 to the application server system 229; decompresses the executable binary files after arrival; creates an application inside the application server system 229; copies the executable binary files 226 to the target folder into the application server system 229; and configures the application to be accessed by concurrent client systems 232.

From there on, the application server system 229 will handle requests from end-users using a Hyper Text Transfer Protocol (HTTP) client system 232, like a web browser. When a request is received, the executable program 230 running in the application server system 229 processes the request, and generates a response. The response can be in HTML or any other adequate markup language or protocol supported by the client system 232. A request generates a response that takes the form of a graphical user interface to be displayed in the client system 232. The returned user interfaces often have embedded controls in them that react to subsequent user generated events, and cause the browser to generate subsequent HTTP requests back to the application server system 229. Taking advantage of the application server system 229 architecture, it is possible for a single client system 232 that the application server system 229 maintains its state throughout a number of interactions with different requests, generated by different user interfaces. For example, it is possible for an executable program 230 hosted in an application server system 229 to generate an initial page as the response to the initial request. This initial page could contain a button. When the user presses the button, the client system generates a new request targeted against the same executable program 230. The application server system enables the existing executable program 230 to process the request and generate another user interface page.

Design Model References

In one embodiment, elements in one design model can be used in other design models. Sharing elements of design models enhances the ability of developers to reuse available functionality. The processing system 99 can facilitate sharing of one or more elements of a computer design model, allowing these elements to be transparently used from other computer design models as if they are part of those other design models. Elements shared by a design model are referred to here as Public elements.

Using the citizen registration example presented earlier, one can imagine a need for the same organization to create a new computer software system that manages information about weddings. The new computer software system would need to handle information about the husband and wife in a wedding and the city where the wedding takes place, sharing the repository for "City" data management with the one already existing computer software system.

Figure 8:
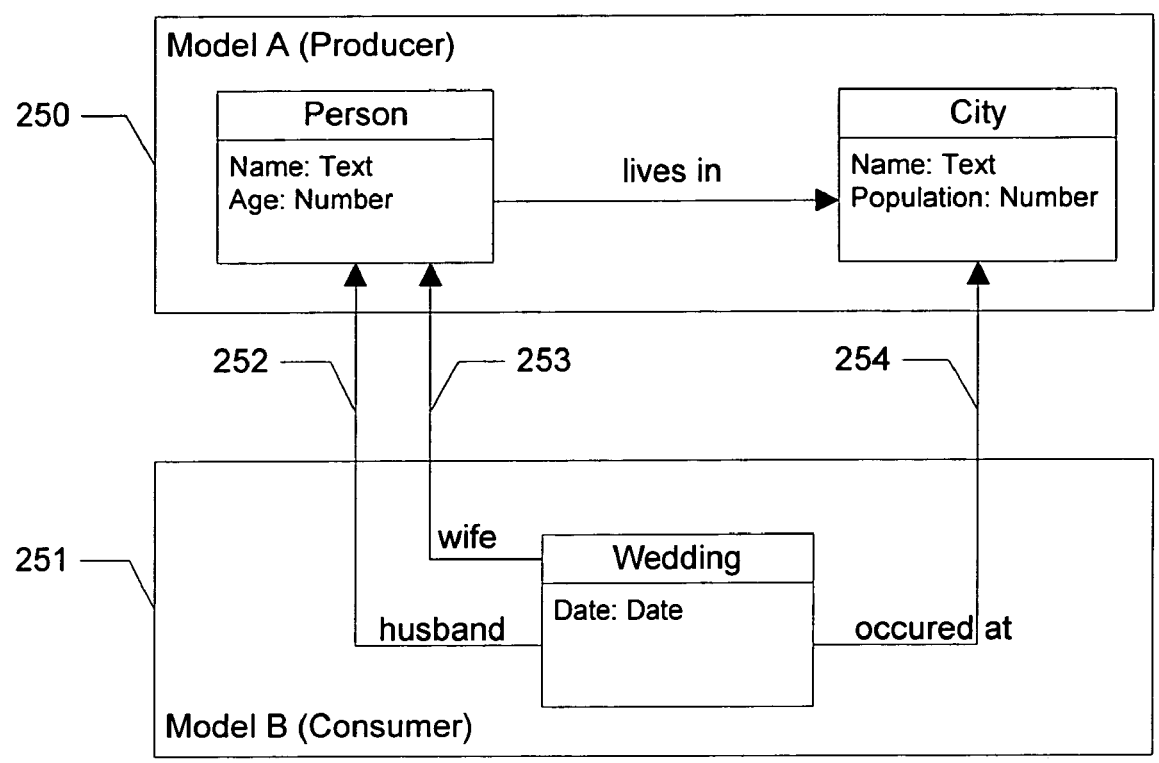
FIG. 8 is demonstrative example of two different design models, one referencing elements of the other.

Referring to FIG. 8, two exemplary design models for the two presented problem domains are shown; in which model A 250 expresses the entities and relationships that describe the problem domain of registering persons as residents of the cities in a country; and model B 251 expresses the entities and relationships that describe the problem domain of registering weddings in the same country.

Given Model A 250, the developer of Model B 251 may decide to reuse the existing "Person" and "City" entities from Model A 250 both to decrease the time required to design Model B 251, and to ensure the data integrity of several models for different problem domains.

As shown, Model B defines the "Wedding" entity, which includes one attribute (Date) that records the date of each wedding, and three relationships with entities of Model A. The "husband" relationship 252 indicates the person that was the husband for the wedding, the "wife" relationship 253 indicates which person was the wife for the wedding, and the "occurred at" relationship 254 indicates the city in which the wedding occurred.

Model References and Interfaces

Models that include references to elements of other models (like Model A to Model B in the above example) are referred to as consumer models. Models that include elements that are referenced from other design models (like Model A) are referred to as producer models. One model can be simultaneously a producer and a consumer. These names are used for illustrative purposes, to better identify each model involved from a particular point-of-view.

Managing References Among Design Models

Figure 9:
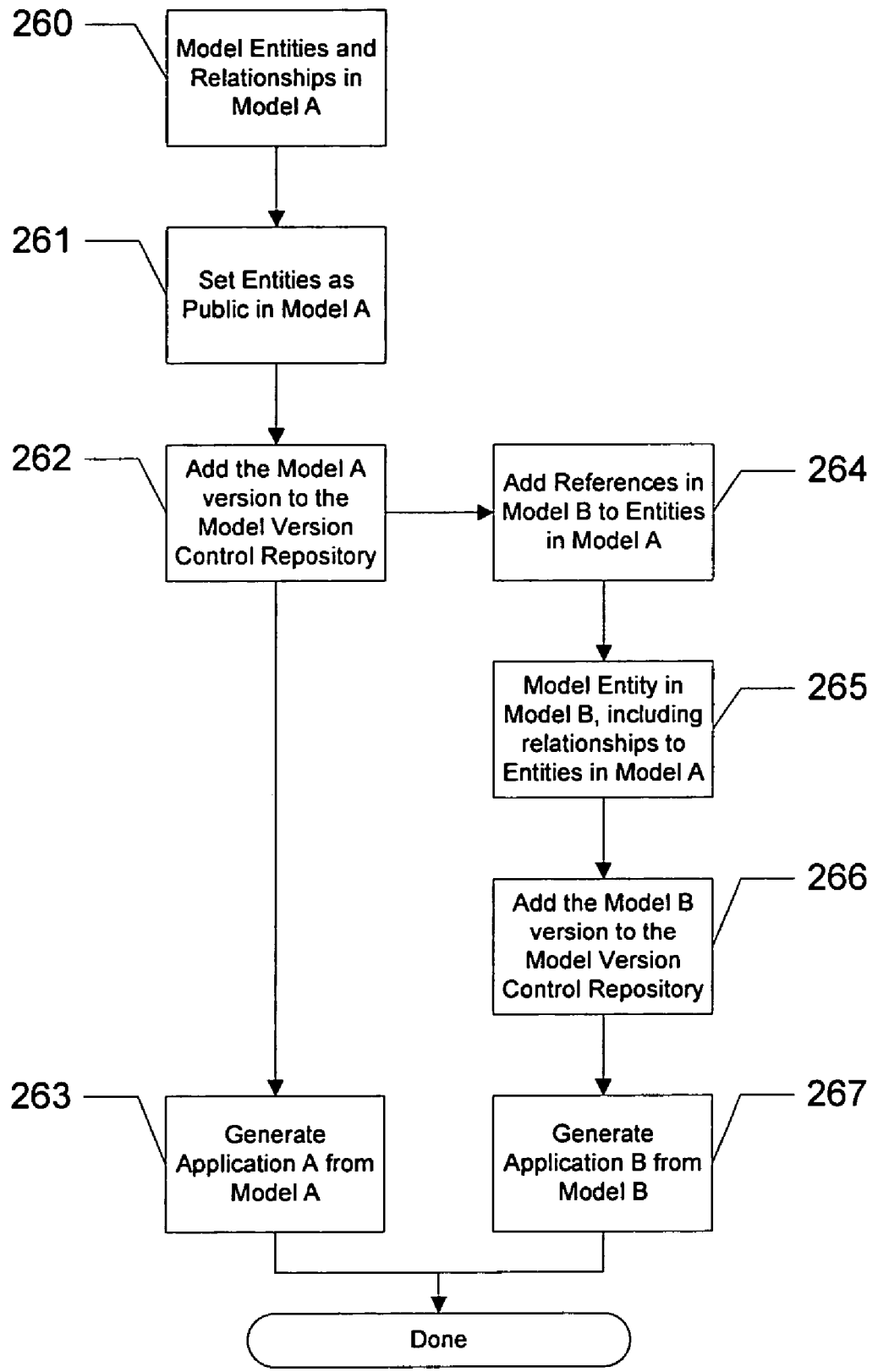
FIG. 9 is a flow chart depicting steps for creating references between two design models according to an embodiment of the invention.

FIG. 9 depicts the generation of references between two design models, Model A and Model B, in order to allow a consumer model, in this example, Model B, to reference elements in producer Model A.

A developer identifies and models the entities and relationships required in Model A (STEP 260), for example to achieve the result presented in FIG. 2. The developer identifies (STEP 261) the need to use the entities in Model A from Model B design models, and thus sets the relevant model elements as "Public." The developer submits (STEP 262) the Model A version to the model repository.

For example, the model description resulting from step 262 could include the following XML:

```
<Model>
    ...
    <Entities>
        <Entity name="Person" ... public="true">
        ...
        </Entity>
        ...
    </Entities>
    ...
</Model>
```

The same or another developer (STEP 263) uses the modeling environment to edit Model B. The developer browses (STEP 264) with a user interface, public elements of other models and selects the public elements in Model A to be referenced from Model B. The developer models (STEP 265)

the new "Wedding" entity in Model B, referencing entities in Model A, already added as references to Model B during step 264. The developer includes (STEP 266) new functionality in Model A to handle data in any of the three entities according to the expressed relationships and constraints just as if they were part of a single model.

The model description document of the consumer design model resulting from step 266 would include a new section that includes all referenced elements from other models, for example:

```
<Model id = "ModelB">
    ...
    <References>
        <Reference ModelId = "ModelA">
            <Entities>
                <Entity Id = "Entity1" name = "Person" primaryKey = "Attribute1">
                    <Attribute id = "Attribute1" name = "Name" type = "Text" />
                    <Attribute id = "Attribute2" name = "Age" type = "Integer" />
                    <Attribute id = "Attribute3" name = "LivesIn" type = "Entity2" />
                </Entity>
                <Entity Id = "Entity2" name = "City" primaryKey = "Attribute4" >
                    <Attribute id = "Attribute4" name = "Name" type = "Text" />
                    <Attribute id = "Attribute5" name = "Population" type = "Integer" />
                </Entity>
            </Entities>
            <Actions> ... </Actions>
            <Structures> ... </Structures>
        </Reference>
        ...
    </References>
</Model>
```

The "References" element of a design model contains a set of individual "Reference" elements. A design model can have any number of "Reference" elements. Each reference indicates in a consumer model the public elements of a producer model that can be used in the consumer model. From within a consumer model, any number of public elements of a producer model can be referenced, as long as the developer editing the consumer model is granted access to the producer model.

Given that the definition of an element of a producer model cannot be edited from the consumer model, the "References" section of a consumer model will only include a subset of the definitions of the element, the element's interface, which includes the subset of the definitions of an element that is required to use an element from a consumer model.

The design model elements that can be declared as public are: Actions, Entities and Structures.

"Entity" element interfaces, as present in the "Reference" sections of a consumer model, can include the information below:

```
<Model ...>
    ...
    <References >
        <Reference ...>
            ...
            <Entity id = "..." name="..." description="..." primaryKey = "...">
```

-continued

```
                <Attribute id = "..." name = "..." description = "..." type = "..."/>
                ...
            <Entity/>
            ...
        </Reference>
    </References>
    ...
</Model>
```

"Structure" interfaces, as present in the "Reference" sections of a consumer model, can include the information below:

```
<Model ...>
    ...
    <References >
        <Reference ...>
            ...
            <Structure name="..." description="..." id = "...">
                <Attribute id = "..." name = "..." description = "..." type = "..." id = "..."/>
                ...
            <Structure/>
            ...
        </Reference>
    </References>
    ...
</Model>
```

"Action" interfaces, as present in the "Reference" sections of a consumer model, can include the information below:

```
<Model ...>
    ...
    <References >
        <Reference ...>
            ...
            <Action name="" description="" id = "">
                <Parameters>
                    <InputParameter id = "..." name = "..." description = "..." type = "..."/>
                    <OutputParameter id = "..." name = "..." description = "..." type = "..."/>
                    ...
                </Parameters>
            </Action>
            ...
        </Reference>
    </References>
    ...
</Model>
```

In some implementations, the Nodes section need not be included in the interface, since the information about the actual behavior of the action is not required by a consumer model in order to use the node. The consumer needs only, its identification, inputs and outputs.

Referring again to FIG. 9, having completed step 262, the developer executes step 263 to trigger the execution of the application generator to obtain an executable program to be hosted in the application server system and a database that implement the computer software system represented within Model A. Similarly, having completed step 266, a developer may execute step 267 to trigger the execution of the application generator to obtain an executable program. In the case of computer software system derived from Model B, it will actually implement the behavior and semantics of all elements of Model B, as well as the implementation of the referenced elements of Model A from Model B.

Adding, Removing, and Updating References

Figure 10:
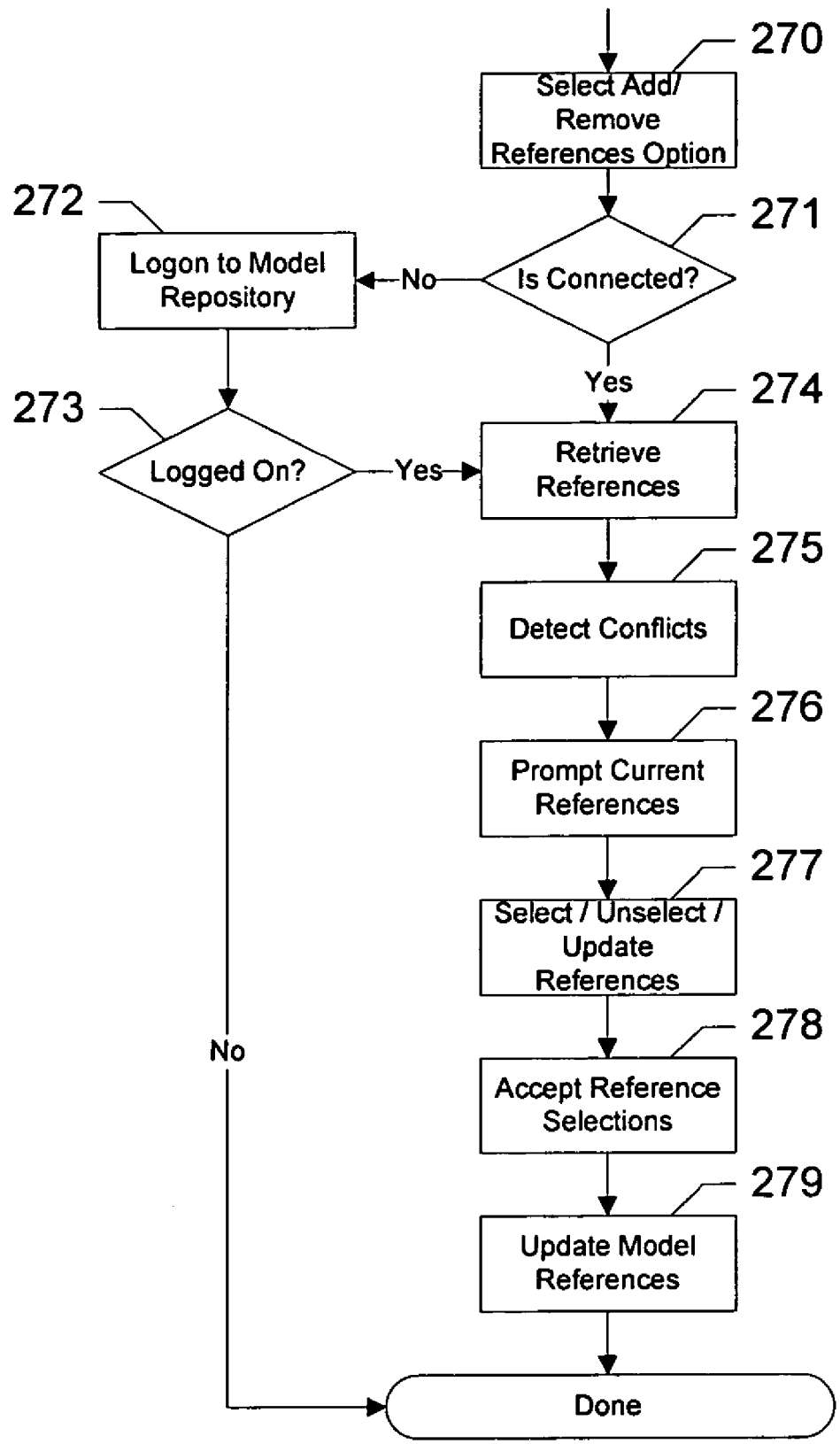
FIG. 10 is a flow chart depicting addition and removal of references to a design model according to an embodiment of the invention.

Referring to FIG. 10, the operations performed by the processing system 99 when adding, removing or updating the references of a consumer model can begin with a developer deciding (STEP 270) to add or remove references from a consumer design model opened with the modeling environment. The modeling environment verifies (STEP 271) that the user is connected and logged on to the model version repository, and if that is not the case, (STEP 272) the user is prompted with a logon window requiring, for example, his username and password. Once the user is authorized by the model repository (STEP 273), the modeling environment retrieves (STEP 274) public element information about producer design models from the model version repository. This information can include the list of design models the user is allowed access to, the list of public elements for each of the listed design models, and the public elements interface specification in the same XML format used within the model description document "References" section. In addition, the modeling environment loads into memory the list of design model elements that are referenced from the current design model as expressed in the model description. This is the information for the version that is being edited by the developer. This information is used to mark which elements of the producer design models are referenced from the consumer design model.

The modeling environment performs a series of conflict checks (STEP 275) to modified elements in the information retrieved from the model repository, performing a comparison between the definition of the elements interface that is retrieved from the model version repository and the definition of the elements interface that is available within the model description of the consumer model. The comparison of reference definitions sequence includes detecting if one producer design model is listed only in the consumer design model description; detecting if one element in a producer design model is listed only in the consumer design model description; and a textual comparison of the XML attributes of the reference present within the consumer model description document and the corresponding definition retrieved from the model version repository in step 274. In addition, the results of the comparison are compiled to identify references to elements of a design model that are not present in the model repository, or to elements of a design model that doesn't contain such public elements in its most recent version, or to elements of a design model that were deleted or that are not public anymore, referred to as "Missing" references; and references to elements of a design model which interface definition is different in the most recent version.

The developer is provided with the results from the comparisons in STEPS 274 and 275. Displayed are: the list of design models the user is granted access to; the list of public elements for each of the listed design models; visual marks denoting which of the listed public elements are already referenced from the design model; visual marks denoting which of the listed design models are "Missing"; and visual marks denoting which of the listed elements of the design models are "Missing"; and visual marks denoting which of the listed elements of the design models are "Modified."

This automated detection of conflicts is beneficial for distributed teams of developers who are collaborating by means of sharing model elements among them, particularly whenever the producer design models are prone to changes.

Operation of Design Model References

Figure 11:
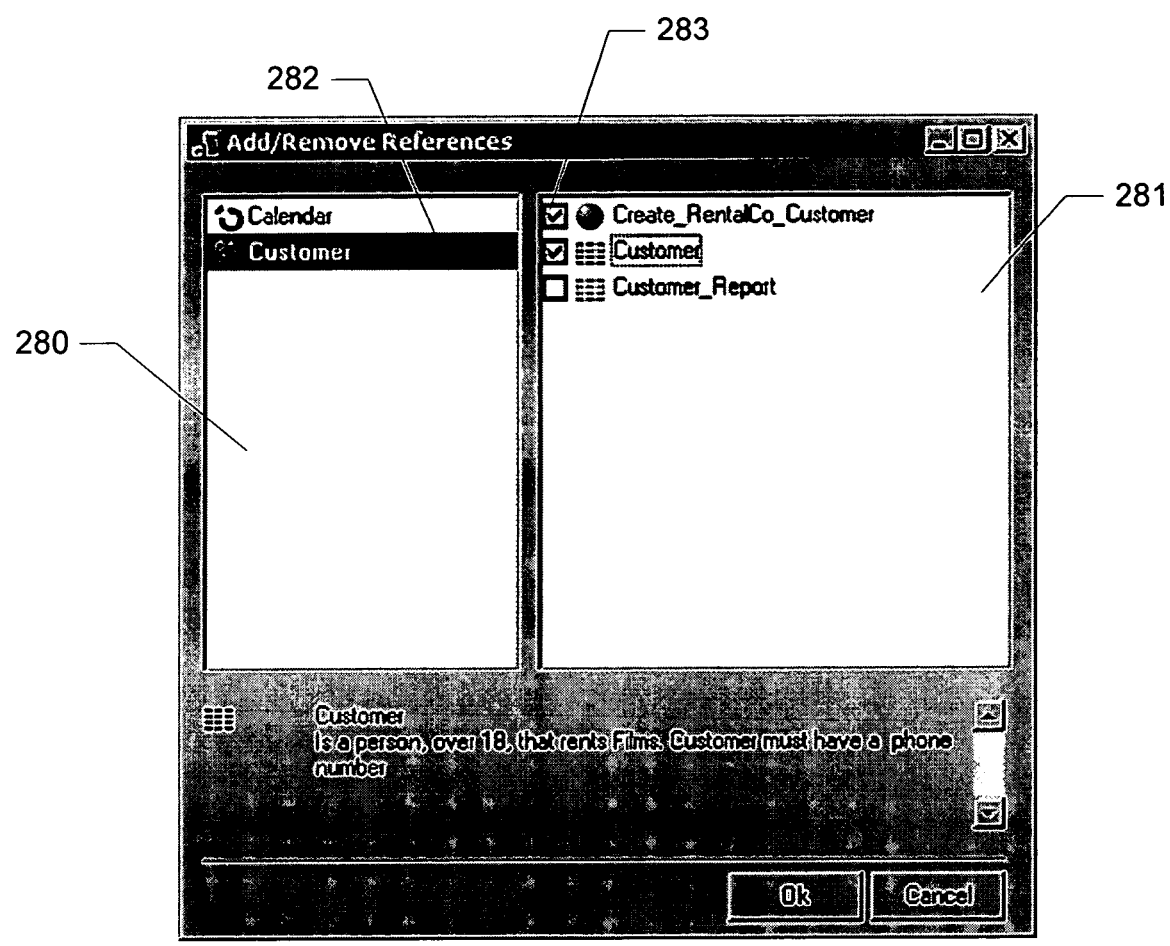
FIG. 11 is a demonstrative screen display of a user interface for adding and removing reference operations.

Referring to FIG. 11, in one exemplary implementation of the visual modeling environment, a user interface prompts and enables developers to check, add and remove references from a computer design model, such as with the flow chart in FIG. 10.

Using the example implementation in FIG. 11, the list of design models that the user has access to is presented in the left pane 280. In the example screenshot, the developer is granted access to two design models, named "Calendar" and "Customer," respectively. The list of public elements of the selected design model 282 ("Customer") is listed in the right pane 281. In the example screenshot, there are three public elements: the "Create_RentalCo_Customer" Action, the "Customer" Entity and the "Customer_Report" Structure. Each of the public elements is labeled with a visual mark, in this case a check mark 283, identifying which of them are referenced from the design model being edited. In the example screenshot, there are two references to the "Customer" design model: one to the "Create_RentalCo_Customer" Action and other to the "Customer" Entity. The "Customer_Report" public Structure is not referenced.

Referring also again to FIG. 10, during STEP 277 for example, the developer interactively selects pubic elements from the listed design models to be referenced or unselects them to be unreferenced. One implementation having the form of the example user interface presented in FIG. 11 allows the developer to click the visual mark 283 to alter the selection of the elements individually. Additionally, for those elements that are "Missing" or "Modified", the developer will interactively decide whether to update the interfaces of the references in the consumer design model according to the definition retrieved from the model repository or to keep the existing interface definition.

After choosing elements to be referenced (STEP 277), the developer may accept the selections to proceed editing the design model using the selected set of references. The visual modeling environment will update the "References" section of the model description of the consumer model (STEP 278). The update of References section can, for example, find all design model elements selected (e.g., in step 277), and for each of them, add the corresponding "Entity", "Action" or "Structure" section to the "References" section of the corresponding design model. If the "References" section does not include a "Reference" for the corresponding design model yet, a new "Reference" section can be added. All design model elements unselected in step 277 can be identified, and for each of them, the corresponding "Entity", "Action" or "Structure" section to the "Reference" section of the corresponding design model removed. Further, the system can identify "Missing" design models detected in step 276 and updated in step 277, and remove the corresponding "Reference" section; find "Missing" elements of design models detected in step 276 and updated in step 277; remove the corresponding "Entity", "Action" or "Structure" sections. The system also can find "Modified" elements of the design models detected in step 276 and updated in step 277.

Generation and Deployment of Public Elements

Figure 12:
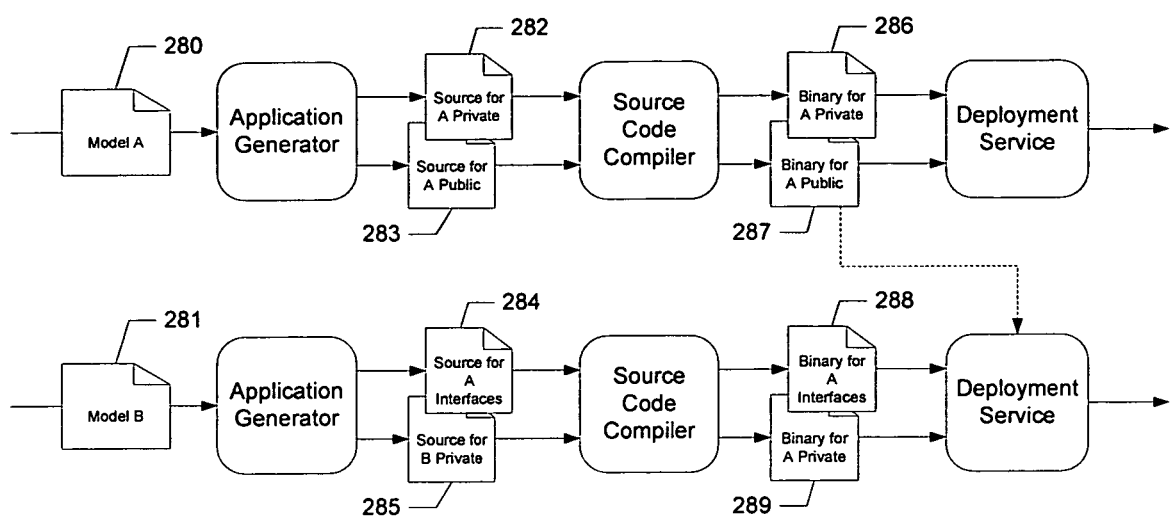
FIG. 12 is a block diagram depicting a system for generating executable programs for two interrelated design models according to an embodiment of the invention.

As described, the use of computer design models to define large scale computer software systems is significantly enhanced using references among computer design models. Further enhancement is achieved automating the process of generation and deployment of executable programs from interrelated computer design models. Referring to FIG. 12, the flow of generation of the executable programs is shown for, two exemplary interrelated design models, Model A 280 and Model B 281, where Model B includes references elements in Model A. Model A is provided to the Application Generator and two sets of source files are generated: the source code files for the private elements of Model A 282; and the source code files for the public elements of Model A 283.

Both sets of source files (282 and 283) are provided to the source code compiler to generate two new sets of binary executable files: the binary executables for the private elements of Model A 286, and the binary executables for the public elements of Model A 287. Considering that Model A doesn't include references to other design models, the deployment of Model A would involve the direct deployment of the outputs 286 and 287 of the source code compiler. Model B differs from Model A in the sense that it includes "Reference" elements. In such case, Model B is provided to the application generator and two sets of source files are generated; namely, the source code files for the interfaces that reference Model A 284, and the source code files for the private elements of Model B.

The source code files for the interfaces of Model A 284 are implemented with a proxy that accesses the functionality provided by the actual implementation of Model B. Again, the source code compiler is applied to the sources output from the application generator. Then, the deployment service deploys the executable program for Model B. Deployment of Model B involves not only the output from the source code compiler 288 and 289, but also the actual implementation of the public elements of Model A 287. Thus, the resulting executable program for Model A includes the binaries 286 and 287, and the resulting executable program for Model B includes the binaries 287, 288 and 289.

Automated Modification of Design Models

Given the high productivity rates that developers 100 desire to attain, the time to implement and maintain computer design models can be reduced if the complexity induced by version and dependency management complexity can be removed or at least reduced.

Referring again to FIG. 1, in some embodiments, the processing system 99 automates and assists a developer to detect and apply design model modifications made by other developers to a design model or to other dependent design models. The modeling environment presents relevant information and tools to support this effort, for example when opening a design model, merging two versions of a design model, retrieving a design model from the model repository, and submitting a design model to the model repository.

Opening Design Models

Assisted modification of design models is beneficial when opening a design model that is not retrieved from the model repository. Often, developers disconnected from the model repository store the result of their work on a local hard disk drive. Another scenario is having distributed developers working in different instances of the computer design model processing system, exchanging design model description documents among themselves.

In order to assist developers in such cases, the system can notify a developer if the model description document being opened is not up-to-date according to the model versions stored in the model repository, and allow the developer to select how to proceed with design model. Options include opening the local version of the design model, discarding the local version of the design model, retrieving the most recent version from the model version repository; or calculating differences and merging the local version of the design model with the most recent version of the design model stored in the model version repository.

Figure 13:
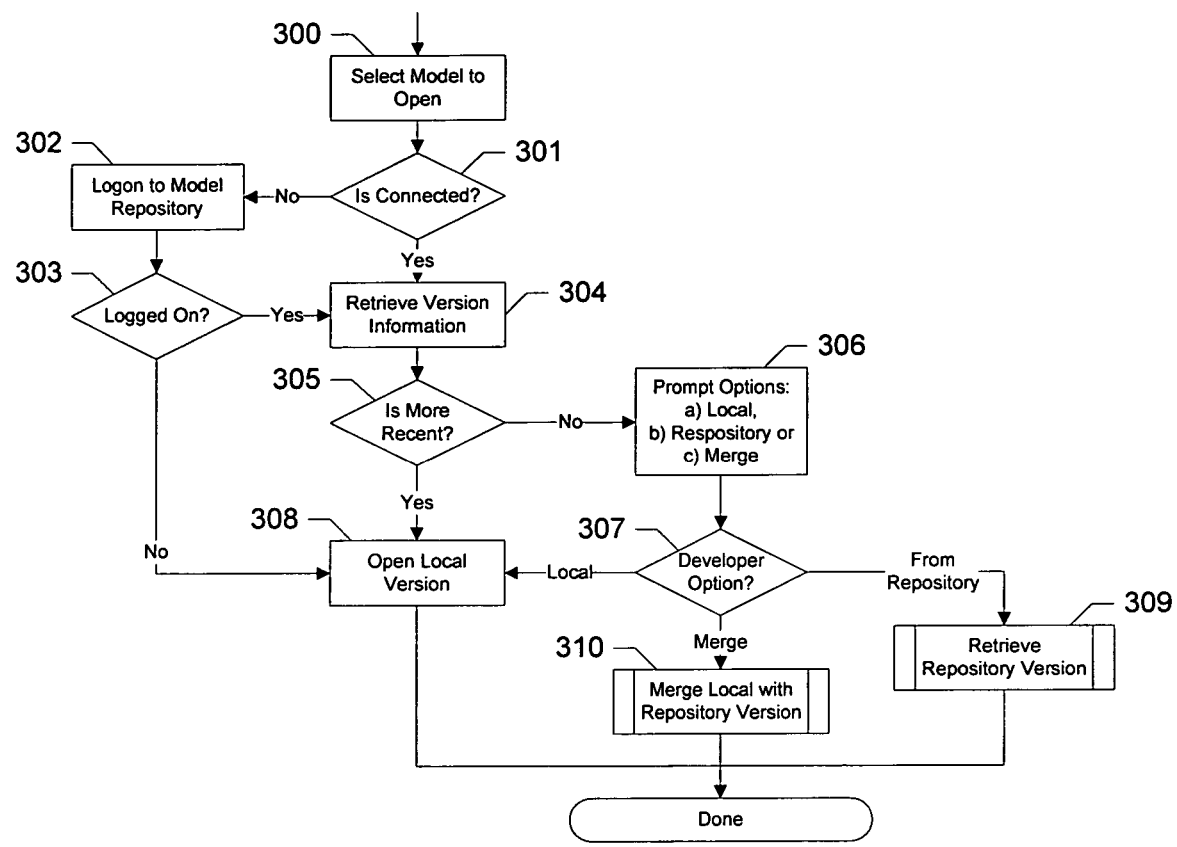
FIG. 13 is a flow chart depicting opening a model description document using a visual modeling environment according to an embodiment of the invention.

Referring to FIG. 13, the system can facilitate management of model versioning by taking steps, for example, upon opening a model description document using the visual modeling environment.

A developer selects (STEP 300) a design model description to be opened, possibly by browsing a file system. The modeling environment verifies (STEP 301) if the developer is already connected and logged on to the model version repository. If that is not the case, the developer is authenticated (e.g., prompted with a logon window requiring his username and password). Once the user is authorized by the model repository the modeling environment can either open a local version or the modeling environment retrieves a list of versions of the design model from the model repository for comparison with the information available within the model description being opened. The list of versions retrieved from the model repository is compared with the list of versions present in the "Versions" section of the model description (STEP 305). If at least one of the versions retrieved from the model repository is more recent than the most recent version present in the "Versions" section of the model description, it means that there are more recent versions of the model than the one that the developer is trying to open. In such case, the visual modeling environment will proceed to step 306, otherwise the local copy of the design model document is used (STEP 308).

If there is a more recent version in the model version repository, the developer is prompted with three options available for decision: (1) opening the design model document selected in step 300, and proceeding with the older version (STEP 308); (2) retrieving the most recent version of the design model stored in the model version repository, and updating references as explained below with reference to FIG. 16; (3) comparing and merging the design model document selected in step 300 with the most recent version of the design model stored in the model version repository, as described below with reference to FIG. 14.

In step 308, the visual modeling environment parses the complete design model description and creates an in-memory representation suitable for visual editing of the models.

Merging Model Versions

Often, multiple developers editing the same design model diverge in the modifications they perform in parallel. At the end, unlike with what happens with source code, design models cannot be easily compared and merged by using simple textual comparisons.

There is a benefit, then, to assisting a developer editing a model whenever there are other model versions that she wants to merge with her current version.

Figure 14:
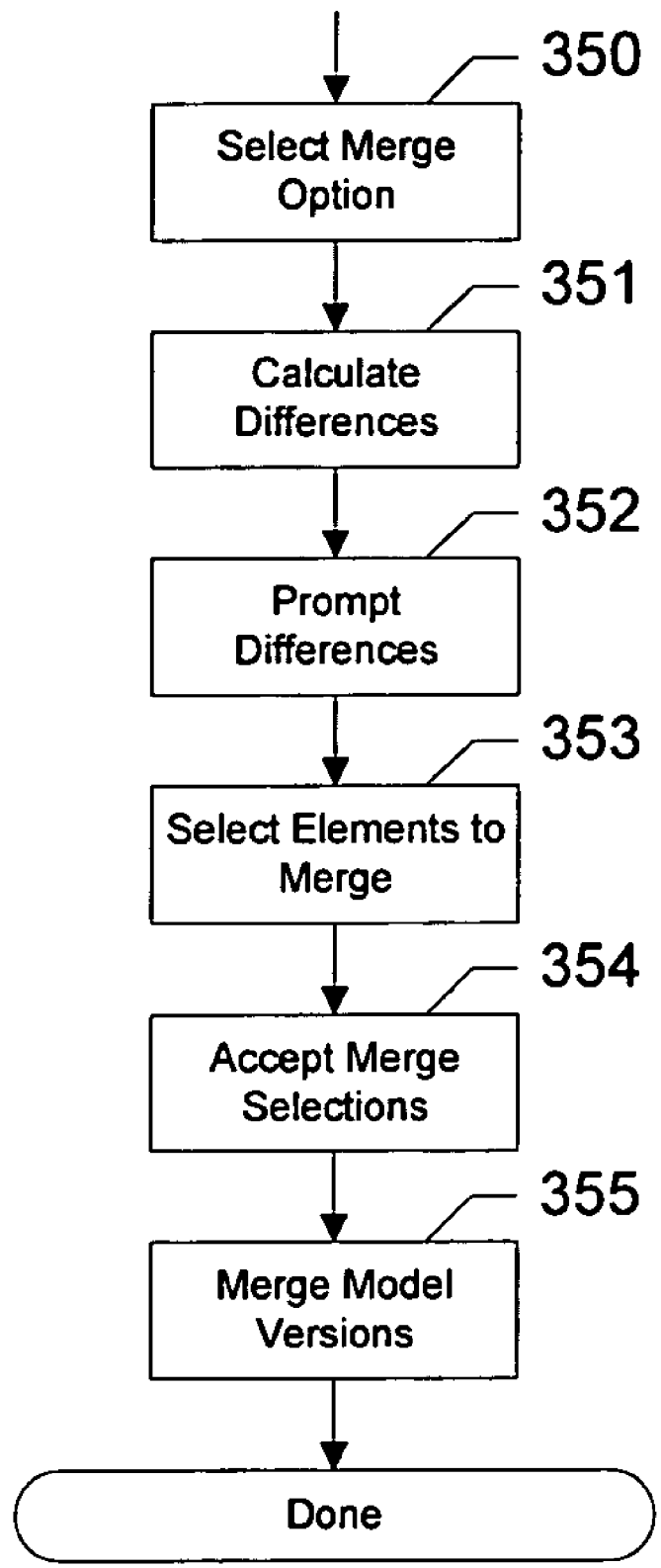
FIG. 14 is a flow chart depicting merging two versions of a design model according to an embodiment of the invention.

Referring to FIG. 14, a developer can merge two different model versions, by first deciding to merge two versions of a design model (STEP 350). In this example, the two versions are the currently open computer design model and a selected second model description for example, one that the system identified in STEP 305 above. The first and the second versions of the design model are parsed (STEP 351), loading into memory a list of elements in each model version, each of them tagged with the version number expressed in the "Version" attribute of the element, as available in the model description. The content of the "Versions" element in the model description documents of each of the versions is also parsed and loaded into a in-memory representation. A sequence of substeps is then executed to calculate the differences between the first and the second versions. The first and the second lists are compared to determine the most recent version record that is present in both lists, referred to as a baseline. The first and the second lists of elements are compared to detect which of them exist only in the first, and if the stamp of the element in the first list is ulterior to the baseline, add the element to a list of "New" local elements. If the stamp of the element in the first list is prior or equal to the baseline, add the element to a list of "Deleted" local elements. The first and the second lists of elements are compared to detect which of them exist only in the second, and if the stamp of the element in the second list is ulterior to the baseline, add the element to a list of "New" foreign elements. If the stamp of the element in the second list is prior or equal to the baseline, add the element to a list of "Deleted" foreign elements. The first and the second lists of elements are compared to detect which of them exist in both but are marked with different version numbers. If the stamp of the element in the first list is ulterior to the baseline and the stamp of the second is prior or equal to the baseline, add the first element to a list of "Changed" local elements. If the stamp of the element in the second list is ulterior to the baseline and the stamp of the first is prior or equal to the baseline, add the second element to a list of "Changed" foreign elements; Given the lists resulting these comparisons, the modeling environment will prompt the developer with visual representation of the two lists of elements, each presenting visual marks about "New", "Changed" and "Deleted" elements (STEP 352).

Merging of Design Models

Figure 15:
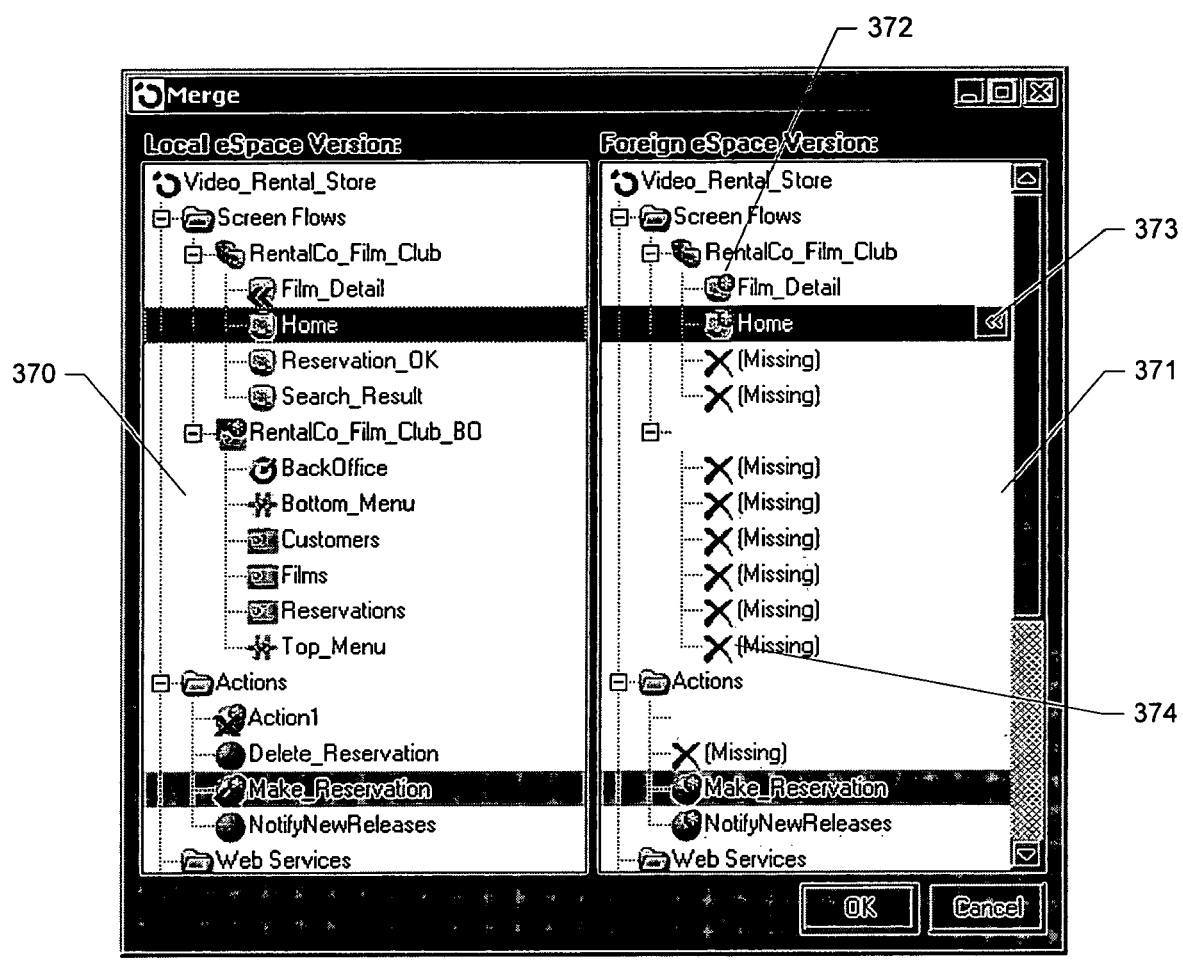
FIG. 15 is a demonstrative example of a user interface display supporting comparison and merge operations applied to two model versions.

In one example implementation of the modeling environment, the user interface that prompts and enables developers to compare and merge elements of two design model versions is presented in FIG. 15. Using such interface, a developer comparing two versions of design model will be presented with the elements of the first in the left pane 370 and the elements of the second in the right pane 371. In the example screenshot, the design model being compared includes two "ScreenFlow" elements with several "Screen" elements each and four "Action" elements.

Following again the steps in FIG. 14 with the example of FIG. 15 to better understand the use of the described user interface, given the output from step 351, the lists include visual marks about the differences detected. The example screenshot in has, an example of a visual mark 372 for a "Changed" element and an example of a visual mark 374 for a "Deleted" element.

When prompted with the differences of the two model version, the developer proceeds interactively with step 353 to decide which version of each element is going to be included in the final resulting merged version. In this example, a default selection includes the element versions from the first version. If the developer decides to choose an element version from the second version, the selection is performed pressing the button 373 available upon selection of each of elements in the right pane 371.

In step 354, the developer reviews and confirms the selection of elements to be present in the resulting merged model version. In this example, additional visual marks are presented to help the developer performing step 354 within the same user interface.

In step 355, a new version of the design model is produced according to the following sub-steps:

i) create a third version of the model as an exact copy of the first model version;
ii) for each of the selected "New" elements from the second version, add the corresponding element from the second version to the third version;
iii) for each of the selected "Changed" elements from the second version, remove the corresponding element from the third version and add the corresponding element form the second version to the third version;
iv) for each of the selected "Deleted" elements from the second version, remove the corresponding element from the third version;
v) add a new version tag to the "Versions" section of the third model.

Following the execution of step 355, the developer can proceed editing the resulting merged version using the visual modeling environment.

Retrieving a Model

Often, when a design model is referenced by others, the responsibility to accept and apply modifications to the dependable models is a distributed responsibility among the developers that maintain each of them. In such case, the assisted verification of modifications of the dependable design models is supported by a method of the present invention that assists a developer to interactively retrieve a design model version from the model version repository, obtaining immediate information about the modifications to the models it references.

Figure 16:
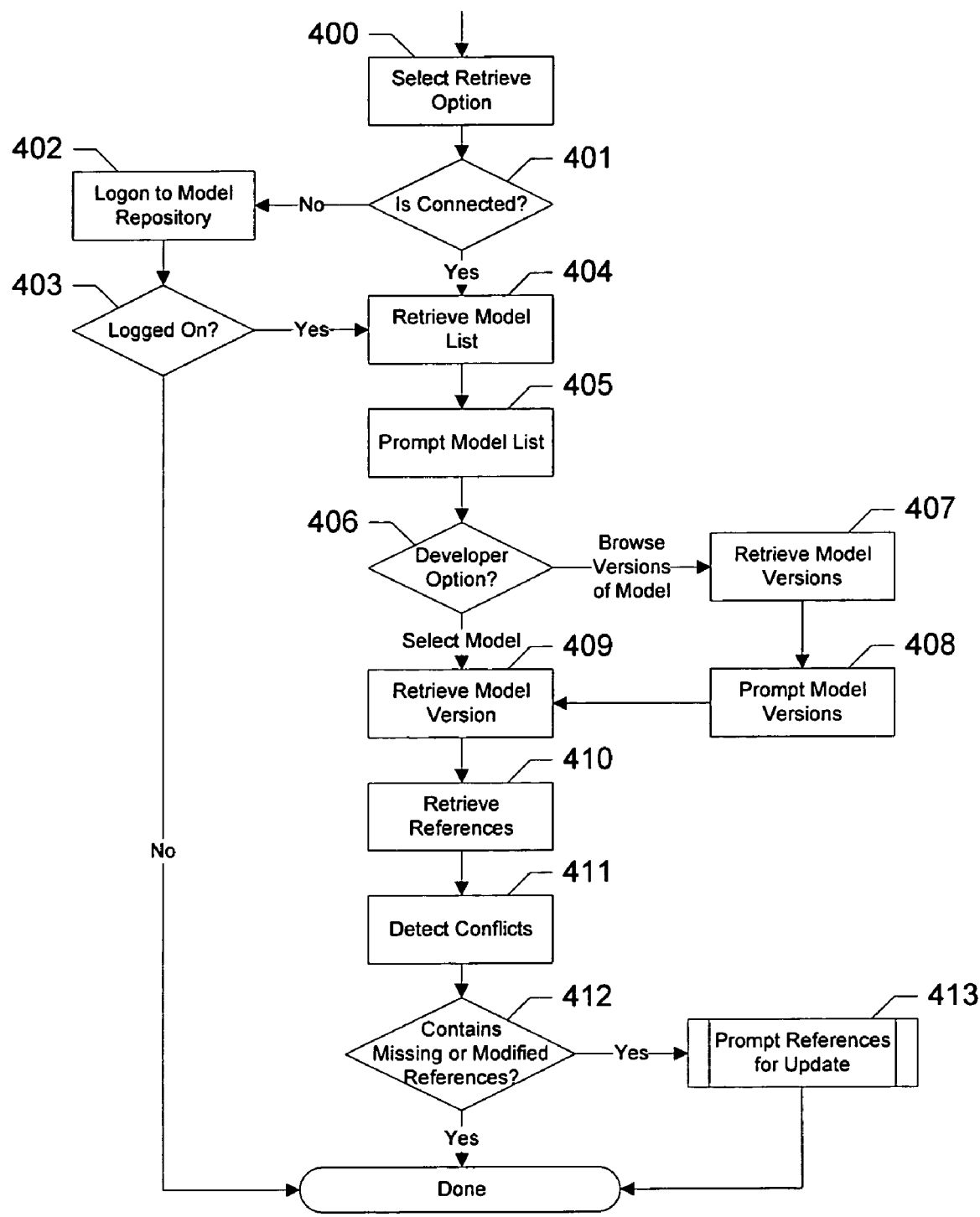
FIG. 16 is a flow chart depicting steps for retrieving a design model from a model version repository according to an embodiment of the invention.

The method for assisting the developer retrieving a model version from the model version repository is depicted by the flow chart in FIG. 16, including the following steps:

In step 400, the developer selects the retrieve option in the modeling environment.

In step 401, the modeling environment verifies if the developer is already connected and logged on to the model repository.

If the developer is not connected, proceed with step 402, prompting a logon window requiring the developer username and password and step 403 verifying the logon operation.

If the developer is connected and is authorized by the model repository in step 401 or step 403, proceed to step 404.

In step 404, the modeling environment retrieves a list of available models in the model version repository to which the developer is granted access to.

In step 405, prompt the list of models to the developer, further including an option to browse all versions of a specific model.

In step 406, if the developer selects a model directly, the modeling environment proceeds to step 409, otherwise proceeds to step 407.

In step 407, the modeling environment retrieves a list of versions of the selected design model.

In step 408, the list of versions of a model retrieved in step.

In step 409, the modeling environment retrieves the model description for the selected version of the selected design model. If stepping from step 405 to step 409, the most recent version is retrieved.

In step 410, for each of the referenced design models from the retrieved design model, the modeling environment retrieves the interface specification of the public elements.

In step 411, the same the same sub-steps of step 275 in FIG. 10 are executed for detecting conflicts between the expected interfaces specification and most recent interface specification.

In step 412, the modeling environment verifies if any missing or modified references are found. In such case, prompts the user with the list of missing and modified elements and executes the same sub-steps of flow chart in FIG. 10, thus allowing the developer to immediately review and eventually accept the modifications performed in the referenced models minimizing the probability of having different specifications of interfaces being used for one element definition.

Submitting a Model

Figure 17:
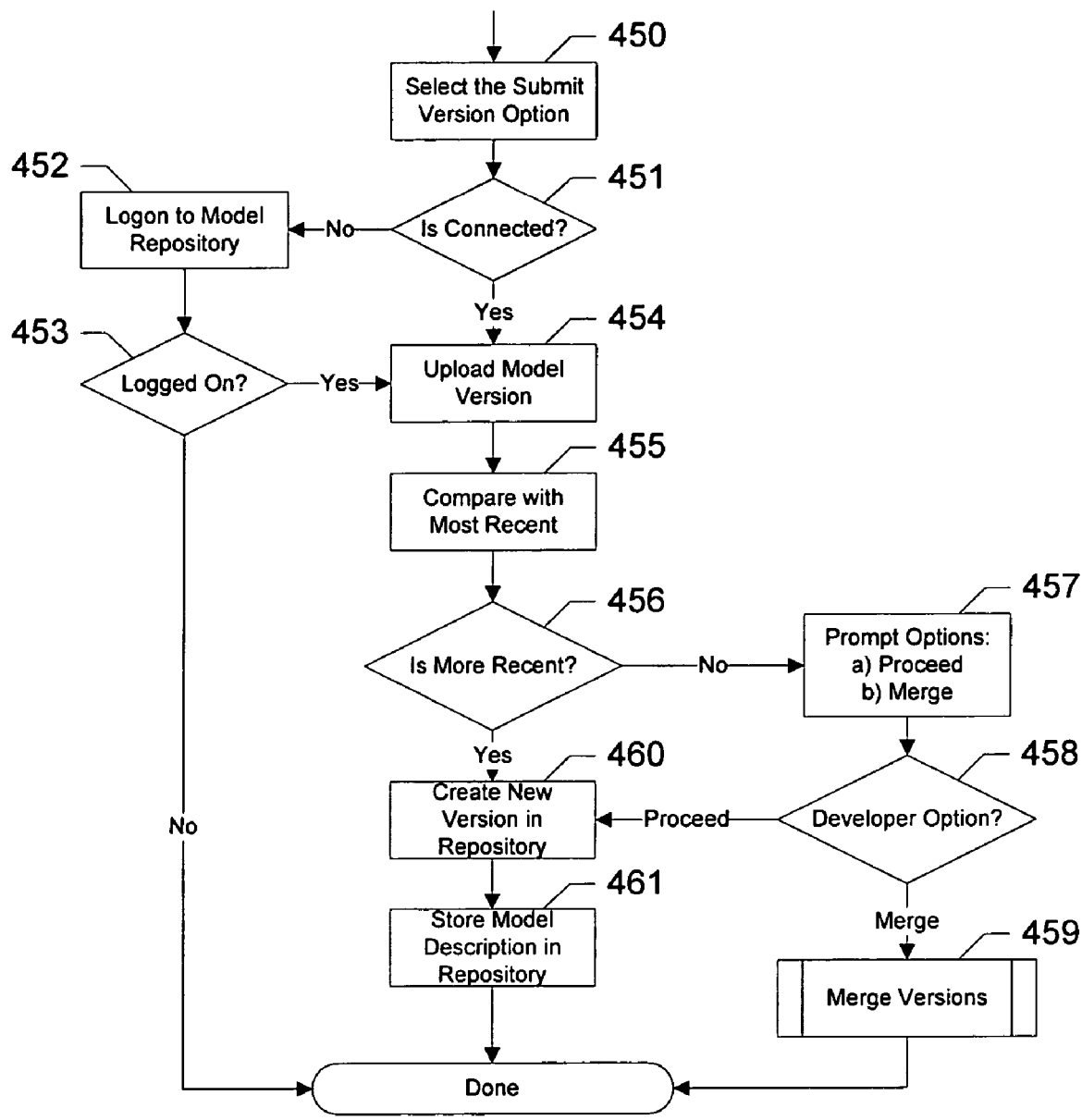
FIG. 17 is a flow chart depicting submitting a new version to a model version repository according to an embodiment of the invention.

Referring to FIG. 17, mentioned, another method of the present invention assists a developer to interactively submit a design model version to the model repository, obtaining immediate information about the models affected by the modifications executed. This method is demonstrated by the flow chart shown in step 450, the developer selects the submit option in the modeling environment.

In step 451, the modeling environment verifies if the developer is already connected and logged on to the model repository.

If the developer is not connected, proceed with step 452 and a logon window is prompted requiring his username and password.

In case the user is already connected authorized by the model repository in step 451 or 453, the modeling environment will proceed to step 454.

In step 454, the modeling environment uploads the model description to the model repository.

In step 455, the model repository retrieves the "Versions" section from the model description.

In step 456, determine whether the most recent version in the repository is included in the "Versions" section, meaning that the version being submitted is based on the most recent version already submitted.

In the case that the most recent version is included in the "Versions" section, proceed with step 461, immediately adding the new version to the model repository.

In the case that the most recent version is not included in the "Versions" section, proceed with step 457, prompting the developer with two options: a) proceed submitting the model version even considering that a possibly conflicting version was already submitted; or b) merge the model version being submitted with the most recent version of the model existing in the model version repository.

Upon user selection of option b) in step 458, the modeling environment interrupts the flow execution and triggers, for example, the execution of flow chart in FIG. 14 to merge the version being submitted with the most recent version available in the repository.

In steps 460 and 461 respectively, a new version record is created in the model repository and the model description is stored.

Ramifications and Scope

Although the present invention has been described with reference to specific exemplary embodiments, it will be evident that various modifications and changes can be made to these embodiments without departing from the broader spirit of the invention as set forth in the claims.

Accordingly, the reader will see that the system of the present invention can be used to process computer design models with any degree of complexity, given that they can be expressed in a structured and hierarchical format. Examples of sub-models that may extend the presented computer design models include: class sub-models, object sub-models, component sub-models, deployment sub-models, use case sub-models, state chart sub-models, collaboration sub-models, storyboard sub-models or any other that describe the behavior of computer software systems.

Additionally, it will also be evident that other types of design models that can be similarly be processed using such methods if they can be expressed in a structured and hierarchical format. For example, electronic design models could be automatically processed to produce compound electronic circuits. Using the methods of the present invention, the modification of those models could be significantly improved.

Thus, the scope of the invention should be determined by the appended claims and their legal equivalents, rather than by the examples given.

We claim:

1. An article of manufacture storing processor-executable instructions thereon for facilitating collaborative use of a computer design model when opening a locally-stored description thereof, the article of manufacture comprising:
   (a) instructions to receive a request to open a locally-stored model description document for a computer design model, the locally-stored model description document comprising a history of model versions from which the computer design model described in the locally-stored model description document was modified; and
   (b) instructions to, upon receiving the request to open the locally-stored model description document,
      i) determine whether the computer design model described in the locally-stored model description document is the version of the computer design model most recently stored in a repository separate from the local storage by comparing a list of versions from the repository with the history available within the locally-stored model description document; and
      ii) merge, if the version of the computer design model described in the locally-stored model description document is not the most recently stored version of the computer design model in the repository, the version of the computer design model described in the locally-stored model description document with the most recently stored version of the computer design model in the repository.

2. The article of manufacture of claim 1, wherein the merging comprises selecting elements of the computer design model described in the locally-stored model description document and elements of the most recently stored version in the repository.

3. The article of manufacture of claim 1, wherein the most recently stored version in the repository is the most recently published version.

4. The article of manufacture of claim 1 further comprising instructions to, prior to determining whether the computer design model described in the locally-stored model description document is the most recently stored version in the repository, facilitate the selection of a repository by prompting a user to select a repository available on a computer network.

5. The article of manufacture of claim 1, wherein the locally-stored model description document includes a list of design model history descriptors, each of them comprising information about a user who provided the design model version to be stored, a moment in time when the design model version was provided to be stored, and a repository where the design model version was stored.

6. The article of manufacture of claim 1 further comprising instructions to annotate the locally-stored model description document for the computer design model with version information by:
- assigning a global unique identifier to the design model; and
- annotating the design model with a history descriptor, including a timestamp of the creation, a base version number, and an identification of a user who created the design model.

7. The article of manufacture of claim 1, wherein the instructions to determine whether the computer design model described in the locally-stored model description document is the version most recently stored in the repository comprises instructions to:
- parse the locally-stored model description document to extract a design model global unique identifier and a first design model history descriptor;
- query the repository for the most recently stored version of the design model using the extracted design model global unique identifier;
- parse the most recently stored version of the design model in the repository to extract a second design model history descriptor; and
- compare the first design model history descriptor with the second design model history descriptor to determine whether the computer design model described in the locally-stored model description document is different from the most recently stored version of the design model in the repository.

8. The article of manufacture of claim 1, wherein the instructions to merge comprise instructions to:
- present a comparison of elements of the computer design model described in the locally-stored model description document with elements of the most recently stored version of the computer design model in the repository;
- facilitate selection of elements in the most recently stored version of the computer design model in the repository for merging into the computer design model described in the locally-stored model description document;
- present an indication of the merging action to be taken for each selected element; and
- take the indicated actions, thereby merging the computer design model described in the locally-stored model description document with the most recently stored version of the computer design model in the repository.

9. The article of manufacture of claim 8, wherein the comparison comprises a visual indication of new elements, changed elements, and deleted elements.

10. The article of manufacture of claim 8, wherein the indicated actions are taken upon user confirmation.

11. A system for facilitating collaborative use of a computer design model when opening a locally-stored description thereof, comprising:
- a repository that stores a plurality of model description documents that describe a plurality of models;
- a receiving module for receiving a request to open a locally-stored model description document for a computer design model, the locally-stored model description document comprising a history of model versions from which the computer design model described in the locally-stored model description document was modified, the local storage being separate from the repository;
- a determining module for determining, upon receipt of the request to open the locally-stored model description document, whether the computer design model described in the locally-stored model description document is the version of the computer design model most recently stored in the repository by comparing a list of versions from the repository with the history available within the locally-stored model description document; and
- a merging module for merging, upon receipt of the request to open the locally-stored model description document and if the version of the computer design model described in the locally-stored model description document is not the most recently stored version of the computer design model in the repository, the version of the computer design model described in the locally-stored model description document with the most recently stored version of the computer design model in the repository.

12. An article of manufacture storing processor-executable instructions thereon for merging a first version of a computer design model with a second version of a computer design model, the article of manufacture comprising:
- instructions to compare a first history section within a first model description document for the first version of the computer design model with a second history section within a second model description document for the second version of the computer design model to identify a baseline, the history section of each model description document comprising a list of model versions from which its version of the computer design model was modified and the baseline being the most recent model version present in both the first and second history sections;
- instructions to compare elements of the first version of the computer design model to elements of the second version of the computer design model and to compare the elements of both the first and second versions of the computer design model to the baseline to identify elements newly-added to, deleted from, or changed in the first version subsequent to the baseline and to identify elements newly-added to, deleted from, or changed in the second version subsequent to the baseline;
- instructions to present the elements newly-added to, deleted from, or changed in the first version subsequent to the baseline and the elements newly-added to, deleted from, or changed in the second version subsequent to the baseline;
- instructions to facilitate selection of elements in the second version of the computer design model for merging into the first version of the computer design model;
- instructions to present an indication of the merging action to be taken for each selected element; and
- instructions to take the indicated actions, thereby merging the first version with the second version.

13. The article of manufacture of claim 12, wherein the indicated actions are each selected from the group consisting of creating, overwriting, and deleting a selected element.

14. The article of manufacture of claim 12, wherein the indicated actions are taken upon user confirmation.

15. The article of manufacture of claim 12, wherein the elements of the first and second versions of the computer design model that can be merged comprise at least one of:
- a data persistency model comprising entity and attribute elements that define a data structure for storing data from a software program;
- a data structure model containing structure and attribute elements that define an hierarchical data structure for transmitting information from and to the software program;

a behavior model containing action elements that define a set of sequential and conditional instructions that define a business rule of the software program; or a user navigation model containing screen elements that define the visual and interactive content for presenting information to an end-user of the software program.

16. The article of manufacture of claim 12 further comprising instructions to annotate a model description document for the merged version of the computer design model with version information.

17. The article of manufacture of claim 12, wherein the instructions to present the elements, facilitate the selection of the elements, and present the indication of the merging action to be taken comprise instructions to:

present the elements of the first version in a first visual list;

present the elements of the second version in a second visual list;

annotate the elements of the first and second lists with specific visual marks that denote the element status, as one of new, changed, or conflict;

annotate the elements of the first and second lists with specific visual marks that denote non-existing elements, including marks in the first list for elements that are deleted in the second list and marks in the second list for elements that are deleted in the first list;

select all the elements of the first list automatically; and upon user selection of elements or non-existing elements in the second list, update the first list with specific visual marks that denote the merge action to be taken, as one of merge, remove, or replace.

18. The article of manufacture of claim 17, wherein the instructions to take the indicated actions, thereby merging the first version with the second version, comprise instructions to:

determine which new elements of the second list are selected, merge the corresponding element of the second version into the first design model version;

determine which deleted elements of the second list are selected, remove the corresponding element from the first version;

determine which changed or conflict elements of the second list are selected; and replace the corresponding element of the first version with the corresponding element of the second version.

19. The article of manufacture of claim 12 further comprising instructions to update references in the first version of the computer design model to overwritten elements according to the elements' interface modifications.

* * * * *